(12) United States Patent  (10) Patent No.: US 6,425,226 B1
Kirschner  (45) Date of Patent: Jul. 30, 2002

(54) SYSTEM AND METHOD FOR ORDER PACKING

(75) Inventor: Jonathan Kirschner, Powder Springs, GA (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 09/411,976

(22) Filed: Oct. 4, 1999

Related U.S. Application Data

(62) Division of application No. 08/840,702, filed on Apr. 25, 1997, now Pat. No. 5,996,316.

(51) Int. Cl.⁷ .............................................. B65B 35/30
(52) U.S. Cl. ............................ 53/445; 53/543; 53/168; 53/238
(58) Field of Search .......................... 53/443, 445, 447, 53/154, 155, 543, 168, 171, 202, 237, 238

(56) References Cited

U.S. PATENT DOCUMENTS

| | | | |
|---|---|---|---|
| 2,630,951 A | * | 3/1953 | Slightam .................. 53/154 X |
| 3,371,767 A | | 3/1968 | Rehr et al. |
| 3,397,504 A | * | 8/1968 | Drennan ...................... 53/448 |
| 3,416,640 A | | 12/1968 | Svobida |
| 3,528,213 A | | 9/1970 | Mottweiler |
| 3,727,369 A | | 4/1973 | Lassig |
| 3,815,313 A | | 6/1974 | Heisler |
| 4,161,094 A | | 7/1979 | Blidung et al. |
| 4,166,525 A | | 9/1979 | Bruno |
| 4,222,478 A | | 9/1980 | Gasser |
| 4,930,291 A | | 6/1990 | Boisseau |
| 5,056,294 A | | 10/1991 | Focke |
| 5,105,600 A | | 4/1992 | Depoint, Jr. et al. |
| 5,109,650 A | | 5/1992 | Hogenkamp |
| 5,211,528 A | | 5/1993 | Kato |
| 5,230,206 A | * | 7/1993 | Christ ...................... 53/154 X |
| 5,281,081 A | | 1/1994 | Kato |
| 5,328,319 A | * | 7/1994 | Fadaie ...................... 53/238 X |
| 5,359,830 A | | 11/1994 | Olson et al. |
| 5,372,472 A | | 12/1994 | Winski et al. |
| 5,385,438 A | | 1/1995 | Fadaie |
| 5,406,770 A | | 4/1995 | Fikacek |
| 5,411,151 A | | 5/1995 | Sasada |
| 5,412,923 A | | 5/1995 | Lashyro et al. |
| 5,426,921 A | | 6/1995 | Beckmann |

(List continued on next page.)

FOREIGN PATENT DOCUMENTS

| | | |
|---|---|---|
| DE | 3524344 A1 | 1/1987 |
| DE | 3814101 A1 | 11/1988 |
| EP | 317198 | 5/1989 |
| EP | 0591845 A1 | 4/1994 |
| FR | 2593481 | 7/1987 |

*Primary Examiner*—Stephen F. Gerrity
(74) *Attorney, Agent, or Firm*—Finnegan, Henderson, Farabow, Garrett & Dunner, L.L.P.

(57) ABSTRACT

A system and method for order packing forms a mixed pallet or a mixed multi-pack. In this system, a first embodiment utilizes a high volume module, a low volume module, a sorting and packing module, a prepackage module and a mixed palletizer module for picking, sorting, packaging and palletizing articles. In a second embodiment of the present invention, a bulk load can be fed via a carrousel to a bank of elevators. A transfer device will load different levels of the elevators which can then be moved adjacent a discharge conveyor. A lane is provided in this discharge conveyor for each of the elevators in the bank of elevators. The different levels of the elevators are positioned adjacent the lanes and can discharge articles onto the conveyor in order to form groups of the same or different types of articles. Many different types of articles including beverage containers such as cans, bottles or beverage boxes can use this system. A pallet is formed from the same or different sized package and different varieties of articles can be placed within a single package.

38 Claims, 13 Drawing Sheets

U.S. PATENT DOCUMENTS

| | | |
|---|---|---|
| 5,430,992 A | 7/1995 | Olson |
| 5,450,708 A | 9/1995 | Lashyro |
| 5,456,058 A | 10/1995 | Ziegler |
| 5,469,687 A | 11/1995 | Olson |
| 5,553,442 A * | 9/1996 | Fadaie .......................... 53/445 |
| 5,636,966 A | 6/1997 | Lyon et al. |
| 5,678,385 A | 10/1997 | Focke et al. |
| 5,720,157 A * | 2/1998 | Ross .......................... 53/445 |
| 5,765,336 A | 6/1998 | Neagle et al. |
| 5,787,679 A | 8/1998 | Lynch et al. |
| 5,873,214 A * | 2/1999 | Moore et al. ............. 53/447 X |

* cited by examiner

SYSTEM AND METHOD FOR ORDER PACKING

This is a division of application Ser. No. 08/840,702, filed on Apr. 25, 1997(now U.S. Pat. No. 5,996,316), which is incorporated herein by reference.

BACKGROUND OF THE INVENTION

1. Field of the Invention

The present invention relates to a system and method for order packing to form a mixed pallet and a mixed multi-pack. In addition, the present invention relates to a system and method for reducing storage requirements and for forming a design in a stack of articles. The present system and method are contemplated for use with beverage containers.

2. Description of the Background Art

Various order packing methods and systems are known in the art. These systems, however, do not provide great flexibility and do not readily accommodate different sized packages on a pallet. Moreover, with conventional method and systems, it is difficult to customize orders.

In current manufacturing systems, such as a bottling plant for beverage containers, the system is operated with the object of filling a warehouse. Orders are packed from the stock within the warehouse and to therefore meet customer orders, a large inventory is needed. Such beverage containers can include bottles, cans or single serve beverage boxes (such as juice boxes). This leads to increased storage requirements and increased costs.

Also, in current systems for manufacturing beverage containers, for example, the units are stored based on stock keeping units. For example, one flavor of beverage would be stored in six packs, twelve packs, twenty-four packs, etc. The base unit of each of these stock keeping units would be a can of soda for example, but the need to store different sized packages of each soda has lead to an increase in demand for storage space.

Accordingly, a need in the art exists for a simple and effective system and method for order packing. This system should change the production process such that orders are assembled just before they are shipped in order to reduce storage requirements and costs. In other words, there is a need for a production process to be order driven rather than driven by the need to maximize the amount of product warehoused. Also, there is a need in the art to simplify the storage requirements such that items can be stored on the bases of a flavor type, for example, rather than as a stock keeping unit. This need goes hand in hand with a need to reduce current inventory requirements.

SUMMARY OF THE INVENTION

Accordingly, it is a primary object of the present invention to provide a system and method for order packing whereby orders can easily be customized.

It is yet a further object of the present invention to provide a method and system for order packing which reduces inventory requirements and in particular, can store inventory by certain categories such as flavor and not on the basis of a stock keeping unit.

Yet another object of the present invention is to provide an automated mixed pallet makeup system and method.

Still a further object of the present invention is to provide just-in-time order fulfillment whereby secondary packaging decisions can be postponed until order fulfillment.

It is yet another object of the present invention to reduce out-of-stock occurrences and by enabling orders to be filled during production which ensures that the orders can be met.

It is still another object of the present invention to provide support for marketing initiatives.

Yet another object of the present invention is to provide filler utilization in a beverage handling system.

It is a further object of the present invention to provide a more efficient method and system for order packing which permits future stock keeping unit growth capacity.

An additional object of the present invention is to provide a system and method which has great flexibility in its location such as at a production or distribution center.

Still another object of the present invention is to provide a mixed system and method with multi-pack capabilities.

It is yet another object of the present invention to provide a method and system which will result in cost savings by utilizing less people and less equipment.

Another object of the present invention is to provide flexibility in configuring articles into needed packages.

Yet another object of the present invention is to provide a system and method for reducing order picking errors and reducing the overall time required for producing a mixed pallet order.

Still yet another object of the present invention is to reduce cycle time.

These and other objects of the present invention are fulfilled by a system for order packing comprising:

a supply of individual articles;

a packaging subsystem for packaging the individual articles into different sized containers, the different sized containers having a different number of individual articles therein;

a palletizer for palletizing the different sized containers, different sized containers being placeable on a same pallet by the palletizer; and a conveyor system for transporting the articles from the supply to the palletizer and for transporting the containers from the packaging subsystem to the palletizer.

These and other objects are also fulfilled by a method for order packing comprising the steps of:

supplying individual articles to a conveyor system;

transporting the individual articles on the conveyor system to a packaging subsystem;

packaging the individual articles in the packaging subsystem into containers of different size, different sized containers having a different number of individual articles therein;

transporting the different sized containers from the packaging subsystem to a palletizer; and placing the containers onto pallets in the palletizer, different sized containers being placeable on a same pallet by the palletizer.

Yet again, these and other objects are fulfilled by a system for order packing comprising:

a pack supply for supplying preformed packs, the packs containing a plurality of articles;

an article supply for supplying individual articles;

a packaging subsystem for packaging individual articles into packs;

a palletizer for palletizing the packs of articles from both the pack supply and from the packaging subsystem, packs from the packaging subsystem and from the pack supply being placeable on a same pallet by the palletizer; and a conveyor system for transporting the articles from the article supply to the packaging subsystem, for transporting the packs from the packaging subsystem to the palletizer and for transporting the packs from the pack supply to the palletizer.

Moreover, these and other objects are fulfilled by a method for order packing comprising the steps of:

supplying individual articles to a conveyor system;

transporting the individual articles on the conveyor system to a packaging subsystem;

packaging the individual articles in the packaging subsystem into packs, each pack having a plurality of articles;

providing a pack supply separate from the packaging subsystem;

conveying the packs of articles from the pack supply and from the packaging subsystem to a palletizer; and palletizing the packs of articles on a pallet, packs from the packaging subsystem and from the pack supply being placeable on a same pallet by the palletizer.

Still these and other objects of the present invention are fulfilled by a method for avoiding warehousing of palletized articles comprising the steps of:

feeding the articles to a palletizer;

palletizing articles on a pallet with the palletizer;

loading at least some of the pallets directly on a truck from the palletizer; and reducing an amount of loaded pallets stored between the steps of palletizing and loading to thereby minimize storage space requirements.

Further, these and other objects of the present invention are fulfilled by a method of reducing an amount of each type of different types of stock keeping units in a warehouse wherein the types of stock keeping units include both multi-stock keeping units and individual beverage containers, the stock keeping units being at least one of six-packs, twelve-packs and twenty-four packs and wherein, the method comprises the steps of:

providing the stock keeping units to a storage facility in the warehouse, a majority of the stock keeping units being individual beverage containers;

feeding stock keeping units from the storage facility to a handling system;

when the individual beverage packages are the stock keeping units feed to the handling system, packaging the individual beverage containers into at least one of six-packs, twelve-packs and twenty-four packs in the handling system to form desired packages;

minimizing an amount of multi-stock keeping units in the storage facility by forming the desired packages during the step of packaging from the individual beverage containers; and stacking the desired packages and the multi-stock keeping units fed during the step of feeding to thereby form a shipment load.

A system for forming packages of beverage containers having different types of beverage containers in each package fulfills these and other objects of the present invention by providing a conveyor system for feeding a plurality types of beverage containers, a packaging subsystem for packaging different types of beverage containers fed by the conveyor-system into a same package, and means for discharging packages from the packaging subsystem.

Still these and other objects of the present invention are fulfilled by a system for forming packages of beverage containers having different types of beverage containers in each package, the system comprising:

a conveyor system for feeding a plurality of types of the beverage containers;

a packaging subsystem for packaging different types of beverage containers fed by the conveyor system into a same package; and means for discharging packages from the packaging subsystem.

Yet again, these and other objects-of the present invention are fulfilled by a method for forming packages of beverage containers having different types of beverage containers in each package, the method comprising the steps of:

feeding a plurality of types of the beverage containers to a packaging subsystem;

packaging different types of beverage containers into a same package in the packaging subsystem; and discharging packages from the packaging subsystem.

Additionally, these and other objects of the present invention are fulfilled by a system for order packing comprising:

a plurality of elevators, each elevator having a plurality of levels;

a conveyor for feeding articles from the elevators, the conveyor having at least one lane for each of the elevators; and discharge means for feeding articles from the elevators to the respective at least one lane.

Finally, these and other objects of the present invention are fulfilled by a method for order packing comprising the steps of:

providing a plurality of elevators each having a plurality of levels;

holding a plurality of articles on each of the levels of each of the elevators;

feeding articles from the elevators by a conveyor, the conveyor having at least one lane for each of the elevators; and discharging articles from the elevators to the respective at least one lane.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
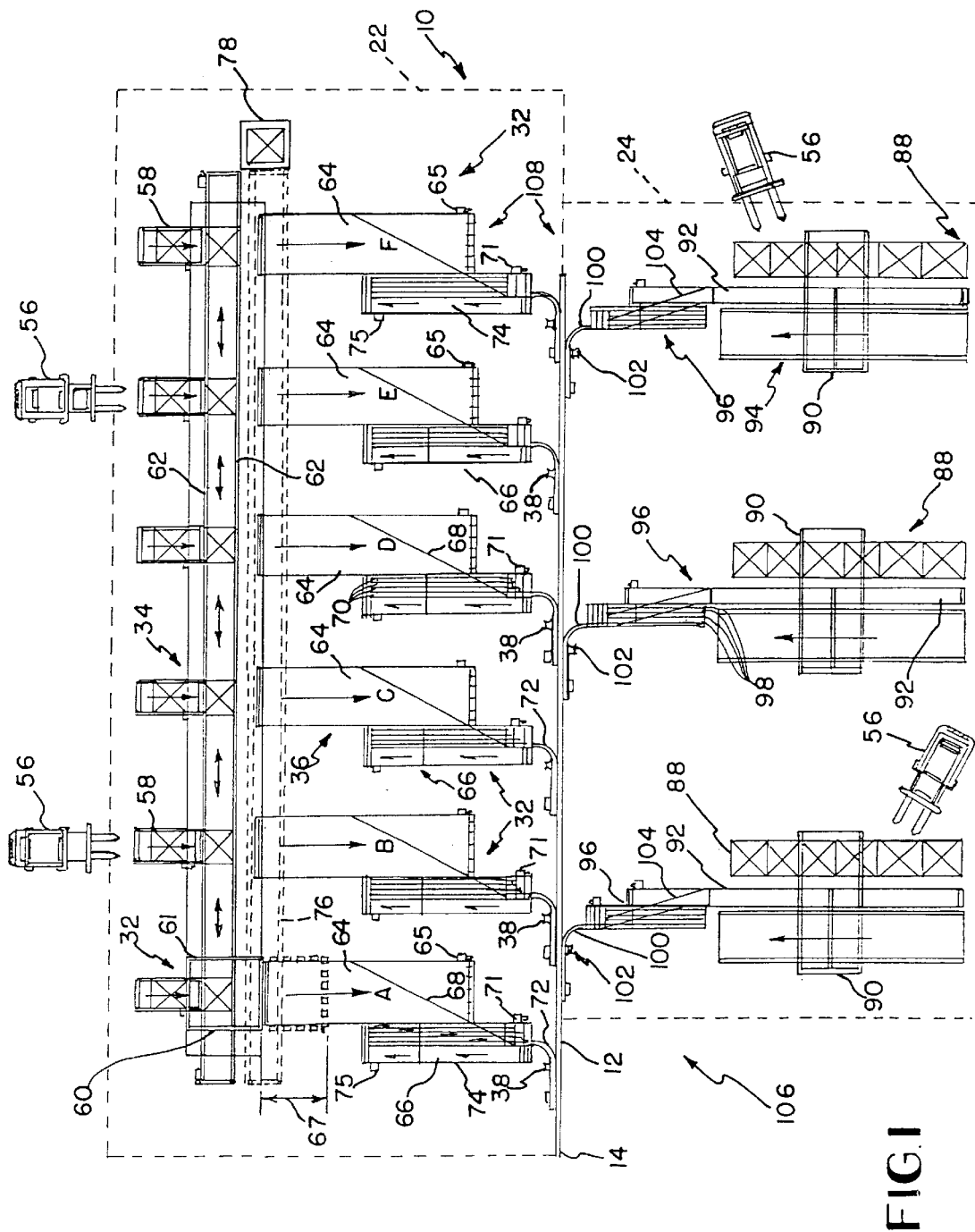
FIG. 1 is a plan view of a first embodiment of a portion showing a high volume module and a low volume module of a system for order packing of the present invention.
Figure 2:
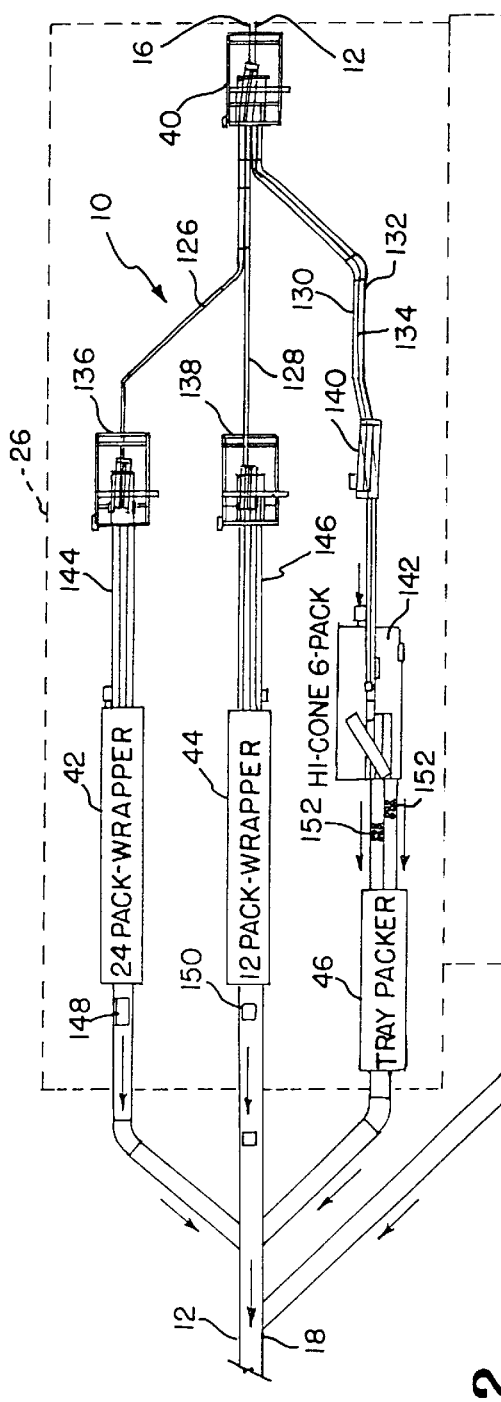
FIG. 2 is a plan view of the first embodiment of another portion showing a sorting and packaging module and a prepackaged module of the system for order packing of the present invention.
Figure 3:
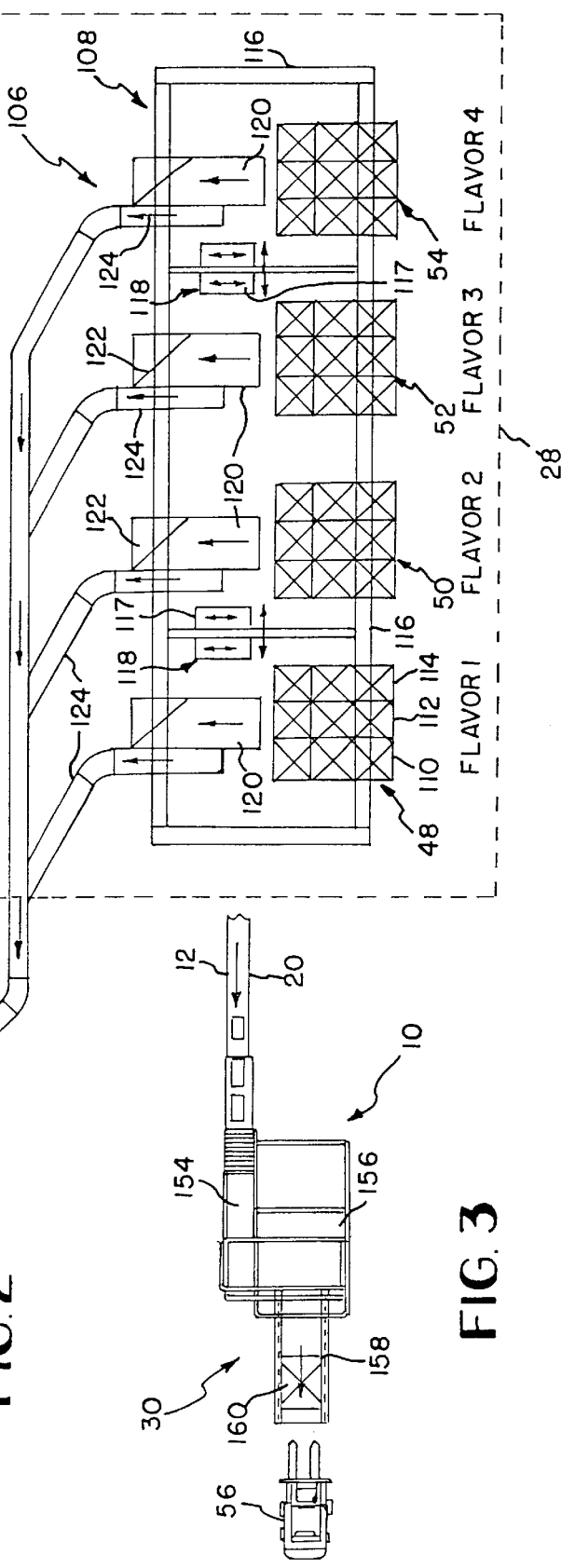
FIG. 3 is a plan view of the first embodiment of a third portion showing a mixed palletizer module of the system for order packing of the present invention.

Referring in detail to the drawings and with particular reference to FIGS. 1, 2 and 3, a first embodiment of a system 10 for order packing of the present invention is shown. A conveyor 12 is shown throughout the three drawings. In FIG. 1, the end 14 of conveyor 12 in FIG. 1 connects to the end 16 of conveyor 12 in FIG. 2. The downstream end 18 of the conveyor in FIG. 2 then connects to the end 20 of the conveyor 12 in FIG. 3. Thus, a complete system 10 for order packing of the first embodiment is shown from FIG. 1 to FIG. 2 to FIG. 3. The arrows adjacent the conveyor 12 indicate the general flow of articles.

The system 10 for order packing of the first embodiment can be divided into five modules. The high volume modules 22 and the low volume module 24 are seen in FIG. 1. These modules feed articles to conveyor 12. The articles move on this conveyor 12 to the downstream sorting and packing module 26, as shown in FIG. 2. The sorting and packing module 26 is adjacent the prepackaged module 28. These two modules 26 and 28 feed articles on conveyor 12 to the downstream mixed palletizer module 30 shown in FIG. 3.

The present invention is generally intended for handling beverage containers for beverages and in particular bottles, cans or single serve beverage boxes (such as juice boxes). It is also contemplated that the present invention is equally useable for other boxed beverages, large sized beverage containers such as one or two liter bottles and for other food containers. Moreover, it is contemplated that the present invention could be used with many other different types of articles, both packaged and unpackaged. To simplify the explanation, however, the present invention will be generally described relative to handling beverage containers.

In the system 10 for order picking of the first embodiment, the five modules will now be generally disclosed. The high volume module 22 and low volume module 24 pick a flavor for the product such as a beverage from a precompiled order. These modules 22 and 24 are contemplated as handling loose cans, bottles or beverage boxes, for example. The high volume module 22 is faster than the low volume module 24 and therefore requires more accumulation equipment 32 as will be described in more detail below. For example, a gantry depalletizer 34 can be used to depalletize each flavor of loose cans from pallets onto an accumulator and single filer 36 as will be described below. A star wheel mechanism 38 will count and release the cans or other articles as they are dispensed to conveyor 12 and moved to the downstream sorting and packing module 26.

Adjacent the high volume module 22 is a low volume module 24. Articles having a lower priority such as less frequently ordered beverages can be stored in this low volume module 24. The details of this low volume module 24 will be described in more detail below. Articles such an cans, bottles or beverage boxes are fed by star wheel mechanism 102 from each of the units in the low volume module 24.

Articles such as cans, bottles or beverage boxes are fed from both the high volume module 22 and low volume module 24 to the sorting and packaging module 26 by conveyor 12. In the sorting and packaging module 26 shown in FIG. 2, different laners are provided for diverting the cans, bottles or beverage boxes to the appropriate wrapper. In particular, a first laner 40 will divert packages from the conveyor 12 to one of four downstream conveyors. Therefore, this laner 40 is a one-to-four laner. Other arrangements for laners are possible as will be described in more detail below.

Downstream from the different laners in the sorting and packaging module 26 are various wrappers 42, 44 and 46. Wrapper 42 is indicated as a twenty-four pack wrapper, wrapper 44 is indicated as a twelve-pack wrapper and wrapper 46 is indicated as a tray packer. While certain designations have been given for package size, it should be appreciated that any sized package can be produced by the wrappers of. the present invention. Moreover, while only three wrappers 42, 44, 46 are shown, it should be appreciated that any desired number of wrappers can be utilized. For example, a single wrapper could be provided if so desired or more than three wrappers could be provided. From the wrappers 42, 44 and 46, articles are fed by conveyor 12 to the downstream mixed palletizer module 30 shown in FIG. 3.

In FIG. 2, a prepacked module 28 is also shown for feeding articles on conveyor 12 to the downstream mixed palletizer module 30. The prepackaged module 28 will be used to fill orders with prepackaged, returned or imported products, for example. The flavor groups 48, 50, 52 and 54 can contain three rows of pallets which each have six-packs, twelve-packs or full cases. As will be described in more detail below, these articles can be fed by conveyor 12 directly to the mixed palletizer module 30. Various combinations of articles can be then handled by the mixed palletizer module 30 in order to form a mixed pallet as will be described below.

Returning to FIG. 1, details of the high volume module 22 will be explained. Pallets of articles can be delivered to this module 22 by fork lifts 56, for example. Of course, any other suitable delivery system could be used. For example, a belt conveyor, roller conveyor, delivery truck or other type of system could be used to deliver pallets of goods or loose goods. The fork lifts 56 deliver the articles on pallets. It is contemplated that a pallet can be a stack of loose beverage containers. This pallet load may be held together with shrink wrap which is removed upon placement of the pallet into the gantry depalletizer 34.

In FIG. 1, six gantry depalletizers 34 are shown. These gantry depalletizers have a movable scissors lift 58 for raising the pallets thereon. After the fork lift 56 places a pallet on the lift mechanism 58 of the gantry depalletizer 34, the pallet can be raised such that the uppermost level of articles is at a desired height. A gantry robot depalletizer 60 runs on tracks 62 in front of each of the lift mechanisms 58. This gantry robot depalletizer 60 can lift the uppermost layer of articles and place them at a layer-placement area on the conveyor belts 64.

Each lift mechanism 58 has a conveyor belt 64 associated therewith as shown in FIG. 1. Of course, any number of lift mechanisms 58 and conveyor belts 64 could be used. In particular, the gantry robot depalletizer 60 could move articles from a first lift mechanism to a nonadjacent conveyor belt 64 if so desired. It is contemplated, however, that normally the gantry robot depalletizer 60 will move articles from the uppermost level of the stack on lift mechanism 58 to an adjacent conveyor belt 64. Moreover, while a conveyor belt 64 has been discussed, it should be appreciated that any type of transfer means could be used. For example, a roller conveyor, a pusher or other arrangement could be used for advancing the articles instead of using the conveyor belt 64.

The gantry robot depalletizer is contemplated as having a transfer head 61 such as a suction head for lifting an entire level of articles such as cans, bottles or beverage boxes from the uppermost level of the stack of articles on lift mechanism 58. Of course, a pusher mechanism or other device could be used to transfer articles from the lift mechanism 58 to the accumulator and single filer 36. Also, instead of using a vacuum head, the gantry robot depalletizer 60 could instead use mechanical grippers, magnetic attraction or any other suitable gripping arrangement.

The conveyor belt 64 of the accumulator and single filer 36 feeds articles in the direction indicated by the arrows. Conveyor belts A, B, C, D, E and F are indicated in FIG. 1. Rather than using six lift mechanisms 58 and six conveyor belts 64, any number of devices could be used as noted above. Moreover, instead of using a single gantry robot depalletizer 60 which services all the lift mechanisms 58 and conveyor belts 64, different numbers of gantry robot depalletizers 60 could instead be used. For example, three lift mechanisms 58 and conveyor belts 64 could be serviced by a gantry robot depalletized such that a pair of gantry robot depalletizers would be used in FIG. 1. Of course, any suitable arrangement could be used as noted above.

Each of the conveyor belts 64 moves the articles in the direction of the arrows. Motor 65 for each of the belts 64 is provided for driving the belts. Thus, the belts 64 are independently movable relative to each other. Control means 194 (to be discussed below with reference to FIG. 9) can be used for controlling the lift mechanisms 58, gantry depalletizers 60 and motors 65. Instead of using a powered conveyor belt 64, these articles could instead be moved by a gravity feed. Nonetheless, in order to ensure that an appropriate number of articles are quickly fed to the single filler units 66, the powered conveyor belts 64 work well.

A diverter 68 is provided at the downstream end of each of the conveyor belts 64. This diverter will move the articles onto the single filler units 66 adjacent to each of the conveyor belts 64. This transfer is carried out by upstream articles pushing the downstream articles onto the single filler units 66. A plurality of powered conveyor lanes 70 are provided for each of the filler units 66. In the arrangement shown, four powered conveyor lanes 70 are shown on each of the filler units 66 with four independent drive motors 71. of course, any number of conveyor lanes could be used. These conveyor lanes 70 continue the forward movement of the articles. The right-most conveyor lane 70 has an outlet lane 72 associated therewith. This is a single outlet for articles such as cans, bottles or beverage boxes from the single filler unit 66 to the star wheel mechanism 38.

Adjacent the four conveyor lanes 70 of each single filler unit 66 shown in FIG. 1 is a return conveyor lane 74. This return conveyor lane 74 moves in a direction opposite to the conveyor lanes 70 and is driven by motor 75. Also, the width of this return conveyor lane 74 is slightly greater than that of the conveyor lane 70. An accessible end of the return conveyor lane 74 is positioned forwardly of the conveyor lane 70. As upstream articles push downstream articles onto the single filler units 66, these articles will move over the powered conveyor lanes 70. To prevent the articles from jamming at the outlet and to avoid too much pressure being exerted on the downstream articles, the return conveyor lane 74 will move articles away from the outlet of area 74. This will provide a circulation effect and ensure that articles can be properly fed to the outlet lane 72 without damaging the articles.

At the downstream end of the outlet lane 72, the star wheel mechanism 38 is provided. This star wheel mechanism includes a star wheel for counting and dispensing desired articles. It is contemplated that each of the gantry depalletizers 34 and associated accumulation equipment 32 can hold individual beverage containers with different flavored beverages. When an order for certain beverages or other handled item is placed through the control means 194, for example, the appropriate star wheel mechanism 38 can be activated in order to dispense the individual articles to the conveyor 12 which will then subsequently be sent to the sorting and packing module 26.

In the gantry depalletizer 34 and accumulation equipment 32 of the high volume module 22, more popular or frequently ordered beverage containers can be stored and handled. Of course, the system could be adapted such that articles with a shorter shelf life could be placed in the high volume module 22 so that they are more quickly handled than articles found in the low volume module 24. Other priority arrangements could be utilized between the high volume module 22 and the low volume module 24.

In the high volume module 22, a pallet discharge conveyor 76 is provided. This conveyor 76 is indicated in dotted lines in FIG. 1 because it is positioned beneath the gantry robot depalletizer 60 and the various conveyor belts 64 and because this pallet discharge conveyor 76 is optional equipment. After a pallet has been completely depalletized, the lift mechanism 58 can be lowered and the pallet then pushed onto the pallet discharge conveyor 76. The empty pallets are fed by this conveyor 76 to the empty pallet stacker 78 at a downstream end of the pallet discharge conveyor 76. As noted, this pallet discharge conveyor 76 and the empty pallet stacker 78 can be omitted if so desired. The fork lifts 56 or other suitable equipment could instead be used to remove empty pallets from the lift mechanisms 58. When an empty pallet is removed, a loaded pallet can then be placed on the lift mechanism 58.

Figure 4:
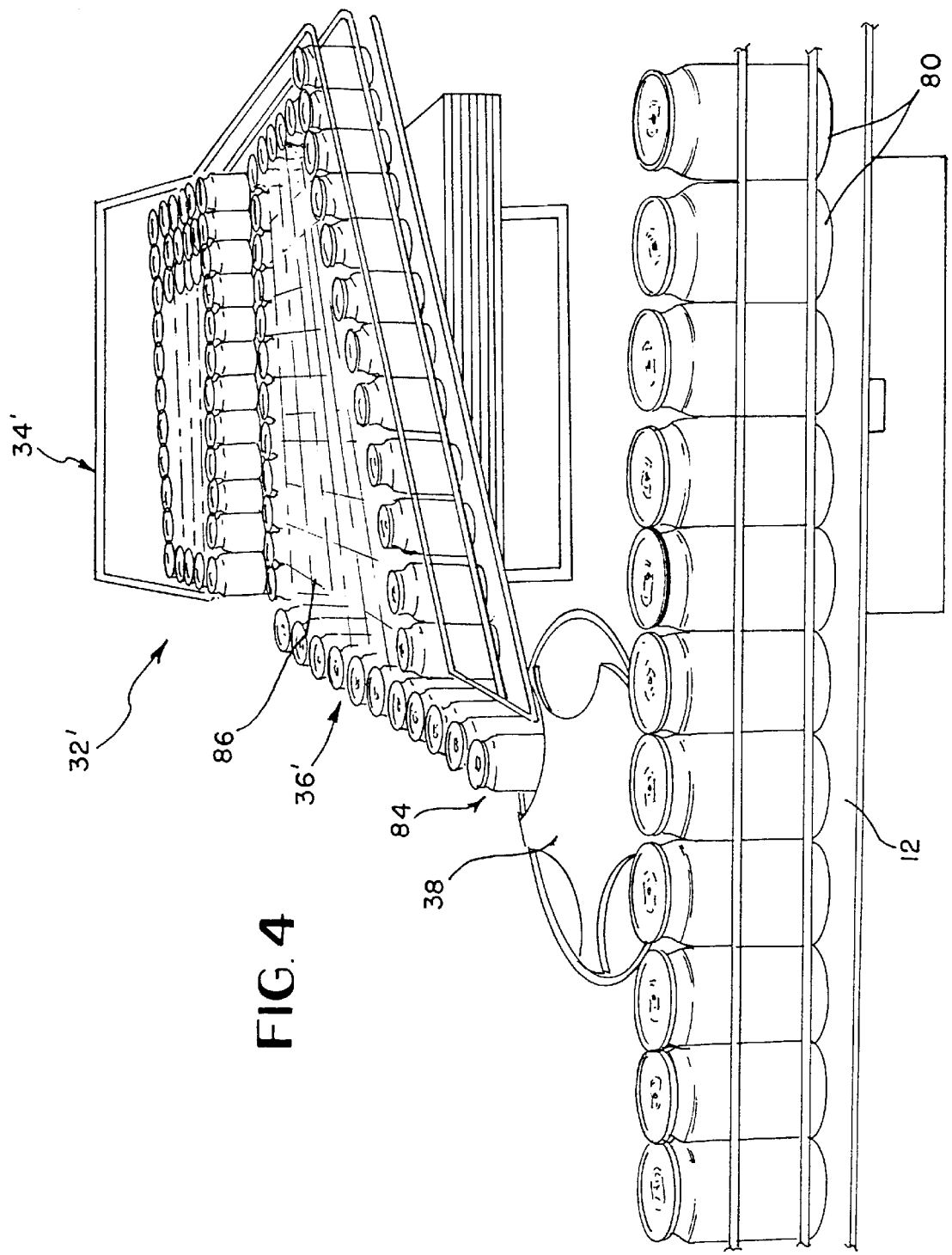
FIG. 4 is a front perspective view of a second embodiment of a gantry depalletizer with a star wheel mechanism of the present invention.

Turning now from FIG. 1 to FIG. 4, a second embodiment of the accumulation equipment 32 will now be described. Similarly to the first embodiment, a downstream star wheel mechanism 38 will feed articles 80 to conveyor 12. The outlet 84 of the accumulation equipment 32' receives articles from a conveyor line. In FIG. 4, upstream accumulation equipment (not shown) has fed articles 80 to the conveyor 12. The star wheel 38 and shown accumulation equipment 32' in FIG. 4 is not activated. When activated, the star wheel 38 will rotate in a clockwise direction in order to discharge articles 80 to the conveyor 12. The articles 80 shown in FIG. 4 are beverage cans. As noted above, bottles, boxes or any other suitable type of article could be handled by the system 10 of the present invention.

A powered conveyor 82 is shown beneath the articles 80 on the accumulator and single filer 36' of the second embodiment. This conveyor 82 can extend complete across all lanes of articles or can only be partially under the lanes. For example, the conveyor 82 shown in FIG. 4 does not extend beneath the rightmost lanes of articles but it could, if so desired. A diverter 68 comprising two rails is provided at a downstream end of the conveyor 82. This diverter will ensure that articles 80 move to the left-hand side of the accumulator and single filer 36'. The downstream left-hand side of the accumulator and single filer 36' in FIG. 4 does not have a conveyor 82 beneath it. This conveyor 82, however, could extend beneath this area. It is contemplated that adjacent conveyor 82, a second conveyor 86 is provided for feeding cans to the star wheel mechanism 38. This second conveyor 86 can be powered independently of the conveyor 82. The conveyor 86 has a width sufficient for a single lane of articles 80 and can extend to the star wheel mechanism 38.

Upstream from the accumulator and single filer 36' is a gantry depalletizer 34' of the second embodiment. This gantry depalletizer 34' consists of a scissors lift for raising the articles to the level of the accumulator and single filer 36'. A pusher or other device is used to move the uppermost layer of articles from the gantry depalletizer 34' onto the conveyor 82 of the accumulator and single filer 36'. Of course, a gantry robot depalletizer or other suitable equipment could be used, if so desired. The accumulation equipment 32' in FIG. 4 acts to selectively dispense articles 80 to the conveyor 12. The control means 194 to be discussed below can control both embodiments of the accumulation equipment 36, 36'.

Returning to FIG. 1, the low volume module 24 will now be described. Similarly to the high volume module 22, fork lift trucks or other delivery devices can be used to deliver pallets of articles to staging area 88. While six pallets are generally shown, any number of pallets could be used. Also, while only a single row of pallets are used, it is possible that plural rows of pallets can be used. Moreover, the pallets do not have to be in contact but could be spaced from one another.

The articles on the pallet loads in staging area 88 are picked up by a gantry robot depalletizer 90. Similarly to the gantry robot depalletizer 60, this depalletizer 90 will pick up an entire layer of articles from an uppermost layer on a pallet in the staging area 88 and transfer the layer to a conveyor 92. A support assembly 94 is provided on which the gantry robot depalletizer 90 moves. This support assembly 94 can include tracks along which the gantry robot depalletizer 90 reciprocates as indicated by the arrows shown in FIG. 1. This enables the gantry robot depalletizer 90 to travel along the length the row of pallets in the staging area 88.

On the gantry robot depalletizer 90, a gripper is provided for picking up the top layer of articles on a particular pallet and transferring these articles to the conveyor 92. While the width of the conveyor 92 is shown as being slightly less than the width of a pallet load, it is possible that these items are the same size or at the conveyor 92 is slightly bigger than the width of the pallet load. Alternatively, the gantry depalletizer 90 can pick up only a few of the articles on the upper layer of the pallet and transfer them to the conveyor 92. The gripper head on the gantry robot depalletizer 90 reciprocates to the right and left as seen in FIG. 1. This will enable movement of the desired articles from the pallet in staging area 88 to the conveyor 92. Because of its movements in directions parallel and perpendicular to the conveyor 92 the gantry depalletizer 90 can pick up all articles from the staging area 88.

If two rows of articles are provided in the staging area 88, then it would simply be necessary for the length of the gantry robot depalletizer 90 to be sufficient in order to reach all articles. Other arrangement, such as a carrousel, conveyor or other feed device can be provided for delivering articles to staging area 88 where they are transferred to the conveyor 92. Also, apart from a gantry robot depalletizer 90, other transfer devices are possible. For example, a supplemental conveyor can feed articles from staging area 88 directly to conveyor 92, a pusher arrangement can be used or any other type of feeding devices are possible. Alternatively, an overhead crane with a gripper head could be used instead of the gantry depalletizer 90. With such an overhead crane, staging areas 88 could be provided on each side of conveyor 92. Access to the staging areas would be provided by the overhead crane.

It is contemplated that a vacuum head will be used on the gantry robot depalletizer 90 in order to remove the desired number of loose cans, bottles or beverage boxes from the upper layer of articles on pallets in the staging area 88. Other than a vacuum head gripper, a mechanical gripper or other suitable transfer device could be used similarly to the gantry robot depalletizer previously described with reference to the high volume module 22.

Each of the conveyors 92 feeds to a downstream single filler unit 96. Therefore, a conveyor 92 and a single filler unit 96 are provided for each of the staging areas 88 in the low volume module 24. While three groups of staging areas 88, conveyors 92 and single filler units are shown, any number of these groups can be used. Moreover, the conveyors 92 could merge to a single filler unit such that the number of these units 96 is less than the number of staging areas 88 and conveyors 94.

Similar to the single filler 66 of the high volume module 22, each of the-single filler units 96 of the low volume module 24 has a plurality of conveyor lanes 98 for feeding articles to an outlet lane 100. A star wheel mechanism 102 is provided for each of the outlet lanes 100. Articles are fed from the outlet lanes 100 to the conveyor 12. The star wheel mechanism 102 is similar to the star wheel mechanism 38 as used in the high volume module 22.

It should be noted that the overall width of the conveyor belt 64 in the high volume module 22 is greater than that for the conveyor 92 in the low volume module 24. Also, the width of each of the single filler units 66 in the high volume module 22 is greater than that for the single filler units 96 in the low volume module 24. As noted above, the high volume module 22 and low volume module 24 provide for prioritizing of the handled articles. Moreover, the amount of space provided for groups of articles can also be dependent on an articles' priority. For the higher priority articles in module 22, more space is provided than in the low volume module 24. This increased space helps to prevent jams in handling the high volume articles. Accordingly in the instant system 10, a different amount of space for groups of articles is provided dependent upon a priority of the articles.

In the low volume module 24, a diverter 104 is provided to aid in transfer of the articles from the conveyor 92 to the conveyors 98 of the single filler units 96. This diverter 104 is similar to the diverter 68 used in the single filler units 66 of the high volume module 22. The single filler units 96 of the low volume module, however, are not shown with a return conveyor lane 74. However, such a return conveyor lane 74 could be used if desired.

Articles which are used more frequently can be stored in the high volume module 22 as noted above, while less frequently used articles can be stored in the low volume module 24. For example, it is possible that up to six flavors can comprise 80% of orders when handling beverage containers. Therefore, these six primary flavors can be handled through the high volume module 22 while the lesser used beverage containers can be handled through the low volume module 24. Both the high volume module 22 and low volume module 24 are contemplated as handling individual articles. In other words, cans, bottles, beverage boxes or other articles handled by the system are individually dispensed from the single filler units in both the high volume module 22 and low volume module 24.

In both the high volume module 22 and low volume module 24, articles are at least temporarily stored. In warehousing, a stored article can be thought of as a stock-keeping unit (SKU). With the high and low volume modules 22 and 24 plus the prepackaged module 28 which will be discussed later, the warehouse 106 contains a plurality of individual beverage containers as well as multi-stock keeping units. The multi-stock keeping units are generally held in the prepacked module 28 and include at least one of six packs, twelve packs and twenty-four packs for each of the stored flavors or types of articles. As previously noted, the prepackaged module 28 fills orders with prepackaged, returned or imported products. In the high volume and low volume modules, on the other hand, individual articles are instead handled. Therefore, the stock keeping units in these modules 22, 24 become the individual articles, such as an individual beverage container. This arrangement helps reduce the required stock keeping units.

The present invention will apply a theory of postponement and/or "white paint" to production and distribution as will be described in more detail below. Basically, a single flavor package will be treated as a base unit that is warehoused, bulk storage. This unit will then be packaged into single units into all other units such as six packs, twelve packs, twenty-four packs, variety packs, etc. Therefore, instead of being required to keep a certain number of six packs, twelve packs, twenty-four packs, etc. of each individual flavor package, it is instead merely necessary to keep the single packages of each flavor available. This helps reduce the overall stock keeping units required for the warehouse 106. The overall inventory can be reduced and fewer out of stocks will occur. Orders can be filled during production which will ensure that the customers' orders are met as will be described in more detail below. Further, the present system 10 will provide for future stock keeping unit growth capacity. If sixteen packs, for example, become popular, then the present system 10 for order packing can easily accommodate such future stock keeping units. Great flexibility and overall cost reductions can be had with the system of the present invention.

Generally, the entire system 10 is considered as being within a warehouse 106. The high volume module 22, low volume module 24 and the prepackaged module 28 constitute a storage facility 108 in the warehouse 106. In addition to the storage facility 108, the sorting and packing module 26 and mixed palletizer module 30 can further be included in the, warehouse 106. Any subsequent upstream or downstream storage of products can also be included in the warehouse 106. While the term "warehouse" has been used, it should be appreciated that this could be a conventional warehouse facility or can be a facility located in a bottling plant, for example. In fact, due to the just-in-time order fulfillment of the present invention, conventional warehousing facilities can be omitted. It is not necessary to store large quantities of packaged beverages prior to shipment. As will be described in more detail below, the individual articles can be packaged just prior to shipments such that they are loaded directly onto the delivery truck. This reduces warehousing space requirements, reduces the need for inventory on hand and helps make the system more efficient. Cost savings and other benefits accrue from the use of the present system and method. These benefits will be discussed in more detail below.

Within the warehouse 106, another storage area involves the prepackaged module 28 shown in FIG. 2. This prepackaged module 28 includes four flavor groups 48, 50, 52 and 54 as shown in FIG. 2. Of course, any number of flavor groups can be used. Within each flavor groups, nine pallets of articles are arranged. In flavor group 48, three rows 110, 112 and 114 are shown. The first row 110 can be six packs of beverage containers, the second row 112 can be twelve packs of beverage containers and the third row 114 can be twenty-four packs of beverage containers, for example. Of course, any type of article can be handled and any number of packaged articles can be used.

As noted above, this prepackaged module 28 is contemplated for use with prepackaged goods, returned goods or imported goods. Therefore, this prepackaged module can be used for specialty items which are not normally order picked, for example. While three rows 110, 112 and 114 are shown for each of the flavor groups 48, 50, 52 and 54, it should be appreciated that any number of rows can be utilized. Moreover, within each row, three pallets are provided but of course, any number of pallets could also be used.

Surrounding all of the flavor groups is a track 116 for the gantry depalletizers 118. This track 116 extends over the rearmost pallets in the flavor groups 48, 50, 52, 54. Access to the entire area of the flavor groups is provided by movement of the gantry depalletizers 118 as indicated by the arrows shown thereon. The gantry depalletizers 118 can include means 117 such as suction cups, a vacuum head or other grippers for gripping a packaged good of articles. For example, a six pack or group of six packs can be picked up from row 110 and placed on conveyor 120 for the first flavor group 48.

Each of the flavor groups 48, 50, 52 and 54 has a conveyor 120 associated therewith. Of course, a single conveyor or other combination of conveyors can be utilized. For example, more or less conveyors than the number of flavor groups can be utilized. The gantry depalletizers 118 would then place the appropriate articles thereon.

It is contemplated that the right-hand shown gantry depalletizer 118 will remove articles from the flavor groups 52 and 54 while the left-hand gantry depalletizer 118 will remove articles from flavor groups 48 and 50. Of course, the tracks 116 can be arranged such that both gantry depalletizers 118 can reach any of the articles within the system.

Moreover, while two gantry depalletizers 118 are shown, it is contemplated that a single gantry depalletizer can be used or any suitable number of depalletizers. Moreover, with an increase in size of flavor groups, then the number of gantry depalletizers 118 and conveyors 120 can accordingly be increased if so desired.

The conveyor 120 is a power conveyor which feeds articles to downstream conveyor 124. Each of the conveyors 120 has a downstream conveyor 124 associated therewith. A diverter 122 is provided at the downstream end of each conveyor 120 for forcing the articles onto the downstream conveyor 124. Of course, any suitable transfer device can be had. In fact, the gantry depalletizer 118 could pick up articles and place them directly on the downstream conveyor 124. However, in order to speed operations, the conveyor 120 permits loading of several packages at a time which are then fed onto the conveyor 124.

The downstream conveyors 124 feed to the conveyor 12. Articles packaged in the sorting and packaging module 26 will be merged with the prepackaged articles from module 28 and fed via conveyor 12 to the downstream mixed palletizer module 30.

The sorting and packaging module 26 of FIG. 2 will now be described in more detail. From the high volume module 22 and low volume module 24, individual articles are fed by conveyor 12. From the end 16 of the conveyor 12 shown in FIG. 2, these articles will move through the first laner 40. This first laner is a servo-laner which can cycle at 40 cycles per minute. The select article can be twelve counts. The conveyor 12 moving into the first laner 40 can be at a speed of 240 feet per minute while the downstream conveyor moving away from the first laner 40 can be also moving at 240 feet per minute. These particular speeds are given by way of example only and should not be considered as limiting the invention.

The first laner 40 basically splits the conveyor 12 into four different lanes 126, 128, 130 and 132. While. the laner 40 is a one to four laner, it is possible that a one to three laner or any other suitable type of laner can be used. The conveyor lane 126 feeds to a second laner 136. The conveyor lane 128 feeds to a third laner 138. The two lanes 130 and 132 are divided lanes 134. These divided lanes 134 feed to a first diverter 140. This first diverter 140 will slow the speed of the article from 240 feet per minute to 120 feet per minute, for example. Basically, this first diverter 140 slows the speed of articles going to the hi-cone six packer 142. The hi-cone six packer places a holder around an upper end of the articles to form a six pack. Typically, these holders are formed from pliable plastic. The exact speeds by which this diverter 140 slows the articles can be varied. Basically, in the example given, the diverter 140 slows the speed by one half. Of course, this diverter could be omitted if appropriate. Also, any of the other laners 136 or 138 could have such a diverter. Also, such a diverter could be provided upstream of the first laner 40. Each of the laners 136 and 138 are one to four laners but of course, any suitable type of laner can be provided. From the laner 136, four divided lanes 144 emerge. From the third laner 138, four divided lanes 146 also emerge. The diverter 140, however, merely continues the two divided lanes 134 to the high-cone six packer 142.

Figure 5:
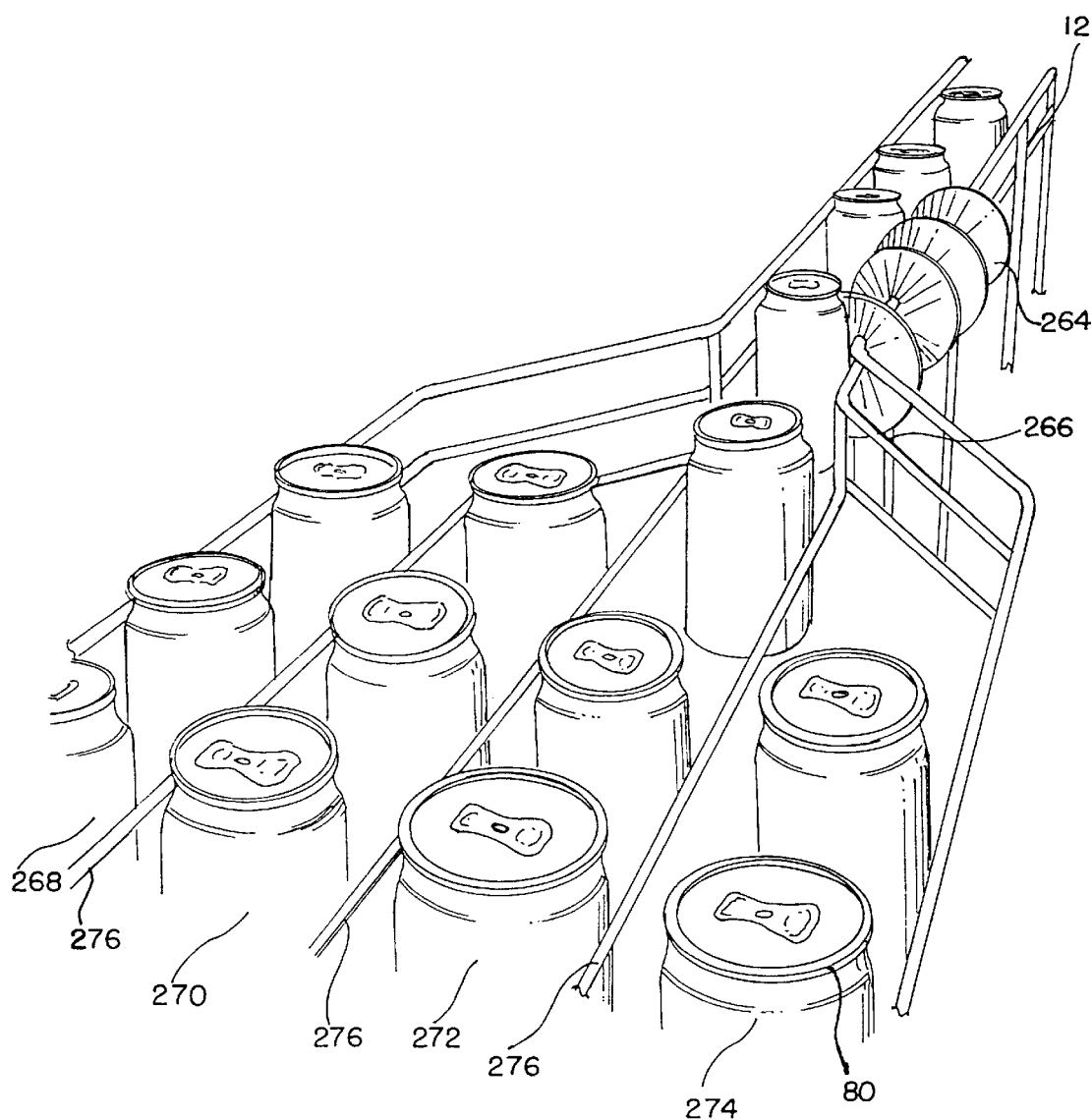
FIG. 5 is a perspective view of a one-to-four laner of the present invention.

In FIG. 5, one of the laners 40, 136 or 138 is shown. This laner is a one to four laner. It can be seen in this FIG. 5 that the conveyor 12 feeds the articles 80 to an auger feeder 264. A diverter gate 266 is positioned downstream from the auger feeder 264 for forcing the articles 80 into one of the four lanes 268, 270, 272 and 274. Bars 276 or other suitable dividers separate the lanes. While not indicated in FIG. 5, a powered conveyor can be provided beneath the laner to drive the articles down the lanes 268, 270, 272 and 274. Also, this feed arrangement could be accomplished with gravity feed, a pusher bar or any other suitable arrangement. While cans are shown as being the articles 80 in FIG. 5, it should again be noted that any suitable article can be handled in the present system. Additionally, while the laner shown in FIG. 5, is a one to four laner, it should be appreciated that such a device could be used in a reverse manner to form a single lane from any number of upstream divided lanes. A control means 194, to be discussed in more detail below, can control movement of the diverter gate 266.

This diverter gate 266 comprises two side panels which pivot about the upstream end. These panels are spaced generally a fixed distance from one another and will divert articles into one of the lanes 268, 270, 272 or 274. It is contemplated that the lanes 268, 270, 272 and 274 will be sequentially filled, but of course any desired filling sequence is possible.

In FIG. 5, the spacing between rows of articles can be varied. The auger feed 264 can vary its speed to space the incoming articles. Therefore, three aligned rows can be formed in the lanes 268, 270, 272 and 274 with the next group of fed articles being spaced from the last article in each lane. Therefore, grouping of articles can be accomplished in the laner.

Returning to FIG. 2, the second laner 136 feeds to the four divided lanes 144 which go to the wrapper 42. While this wrapper 42 has been indicated as forming a twenty-four pack, it should be appreciated that any suitably sized package could be wrapped therein. Exiting from the wrapper, a twenty-four pack 148 is shown. The other four divided lanes 146 feeds to wrapper 44. This wrapper 44 has been indicated as forming a twelve pack but again, any suitably sized package could be produced. A twelve pack 150 is shown exiting from the wrapper 44. The divided two lanes 134 feed to diverter 140 as noted above. Then the speed of the articles is reduced going to the hi-cone six packer 142. While it has been indicated that this packer forms six packs, any desired package size could be provided for forming suitably sized packages. Exiting from the hi-cone six packer are two six packs 152. These six packs 152 continue along the two divided lanes to a tray packer 46.

The conveyor from the tray packer 46 will merge with the conveyors coming from the wrapper 42 and wrapper 44. These articles will then also merge with the downstream conveyor 124 coming from the prepackaged module 28. The conveyor 12 will then continue on to the mixed palletizer module 30 as shown in FIG. 3. It is contemplated that the speed of articles through the section of the conveyor could be 60 feet per minute. Of course, any suitable speed could be used.

Accordingly, the sorting and packing module 26 has been indicated as forming twenty-four packs, twelve packs and tray packs with six packs therein. It should be appreciated that additional conveyor lines and laners and diverters could be used as necessary in order to form any desired sized package. For example, if a high volume of twelve packs were to be handled, then a second laner 138 and wrapper 44 with associated conveyors could be utilized. Of course, other suitable arrangements are possible. This system therefore enables different sized packages to be placed on the downstream portion of conveyor 12. Also, due to the infed from the prepackaged module 28, other items can be infed to conveyor 12. Thus, a wide variety of packaged articles will reach the mixed palletizer module 30.

Figure 6:
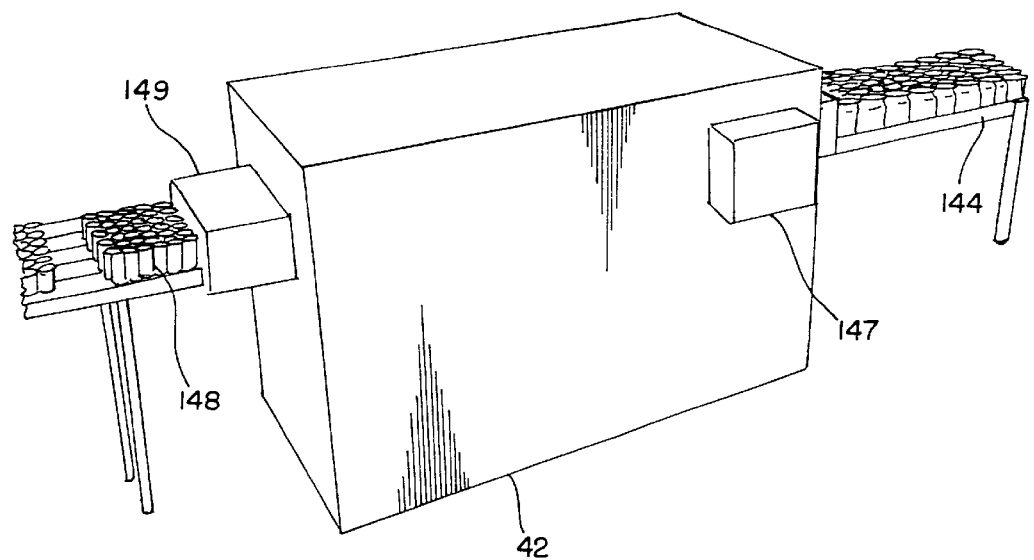
FIG. 6 is a perspective view of a wrapper of the present invention.

In FIG. 6, one of the wrappers 42 is shown. In this arrangement, the divided lanes 144 send four rows of articles to the packer or wrapper 42. They are then wrapped and dispensed from the downstream end 149 of the packer. While a packer for 24 packs 148 is shown, it should be appreciated that the packers can be used to form any suitably sized article. A display 147 can be provided on the side of the packer to indicate what type and/or size of articles are being packaged.

Great flexibility of the prepacked module 28 and sorting and packing module 26 are contemplated. For example, it is possible that a single type of flavor beverage container could be fed from the high volume module 22 to the sorting and packing module 26. There, only twelve packs, for example, could be formed in the wrapper 44, then all of these articles will be fed downstream on conveyor 12 and eventually stacked in the mixed palletizer module 30. Therefore, the mixed palletizer module 30 would form a pallet load of all the same type of beverages and all the same sized beverage packages. However, the great advantage of the present invention comes in that different varieties of beverages, sizes of packages, etc. can be fed to the mixed palletizer module 30.

This mixed palletizer module 30 includes infeed section 154, palletizer 156 and accumulation area 158. The palletizer 156 is a conventional type of palletizer which is know in the art. The infeed section 154 will deliver packaged articles from the sorting and packaging module 26 and prepackaged module 28 to the palletizer 156. The palletizer 156 will then stack the articles onto a pallet. A pallet supply source can be provided. This can include delivery of pallets by fork lift 56 to the palletizers 156. Alternatively, an infeed conveyor or other suitable arrangement can be provided as a source of pallets for the palletizer.

The articles are stacked on the pallets by the palletizer and fed to accumulation area 158. A fork lift 56 or other suitable equipment can be used to remove the loaded pallets from the palletizer 156. While only one pallet load 160 is shown in the accumulation area 158 in FIG. 3, it is possible that this accumulation area 158 could be sized to receive multiple pallet loads. Moreover, this accumulation area 158 can include a pair of conveyor belts or another suitable arrangement for moving pallet loads 160 away from the palletizer 156.

Figure 7:
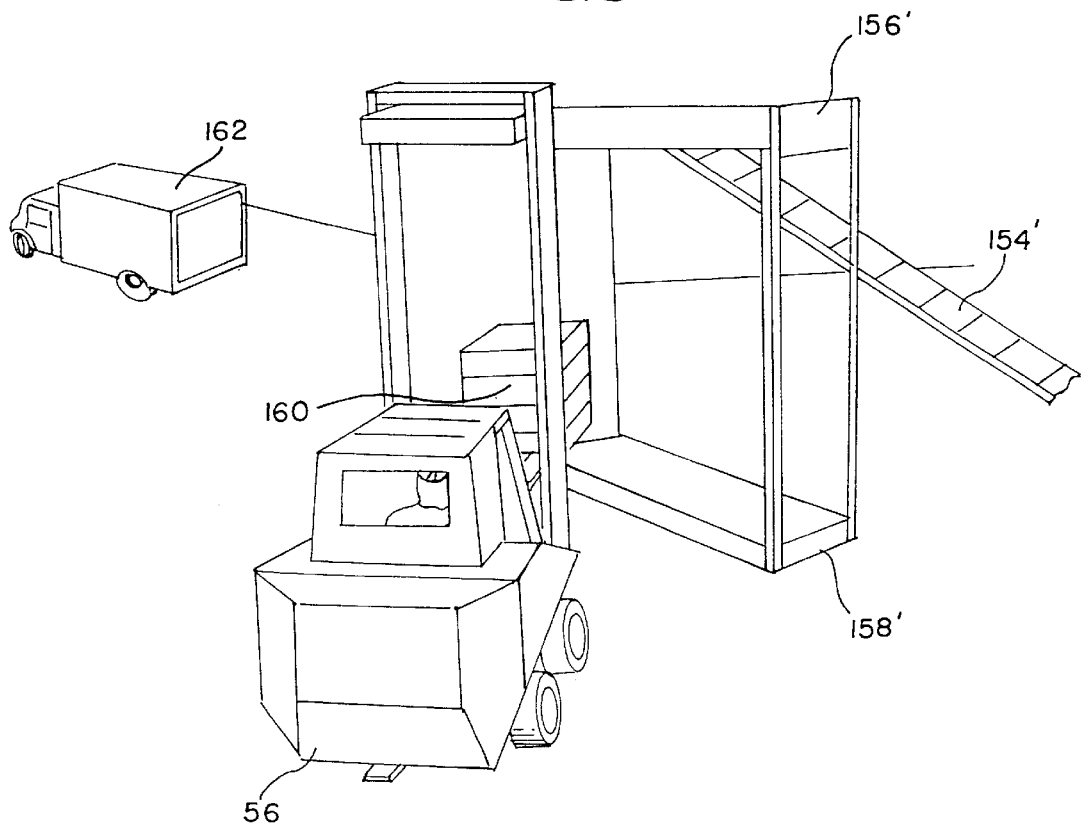
FIG. 7 is a perspective view of a palletizer of the present invention.

In FIG. 7, a slightly modified form of the palletizer 156' is shown. There, the infeed section of 154' feeds packaged articles to the top of the palletizer 156'. They are then stacked on pallets and moved to accumulation area 158'. It should be noted that the fork lift 56 takes a pallet load 160 directly to a waiting truck 162. Therefore, it is not necessary to store loaded pallets in the warehouse. Rather, a just-in-time delivery system can be used. When a truck is scheduled to arrive, the present system 10 can be operated in order to form packaged articles in the sorting and packing module 26. This module 26 as well as the prepackaged module 28 can be used in order to fill pallets as needed. These pallets will then be delivered to the waiting truck 162 such that storage of the loaded pallets is unnecessary. This will reduce warehousing cost. Space for storing loaded pallets is not necessary. Also, carrying cost of excess inventory can be avoided. These costs include interest, required fork trucks and other handling equipment. Also, potential product damage due to a reduction in handling of the articles can be obtained. Additionally, the number of workers required to handle the packaged and palletized goods can be reduced. It is possible that some pallet loads 160 are staged before being put onto truck 162.

The present invention also provides for fewer out of stocks. Orders can be filled during production which ensures that orders are met. The present invention provides more flexibility to configure cans, bottles or beverage boxes or the handled articles into the needed packages.

Figure 8:
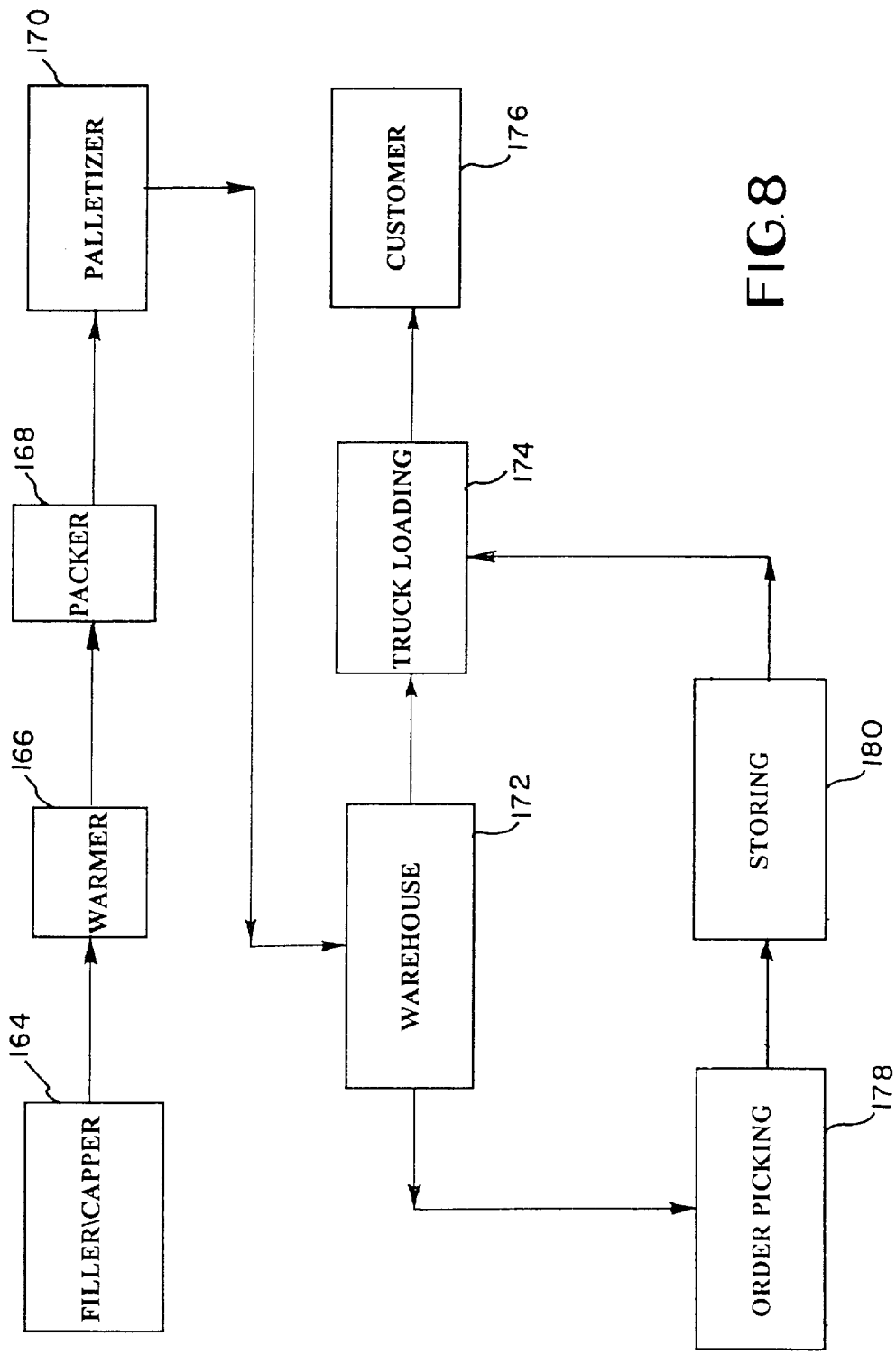
FIG. 8 is a flowchart of an existing process flow.

Conventionally, an order can be filled as shown in FIG. 8. In particular, articles such as beverage containers will move from a filler/capper 164 to a warmer 166 to a packer 168 and then to a palletizer 170. The palletized articles are then stored in warehouse 172. Palletized loads are then removed from this warehouse 172 during truck loading 174 and shipped to the customer 176. A disadvantage to this current system is the need to warehouse products. Also a disadvantage is that when a customer orders less than a full pallet, then manual order picking must be done in step 178. Conventionally, full pallets will be depalletized in order to leave the appropriate number of selected articles thereon. Then the remaining space on the pallet can be refilled with other partial orders to the same customer or a partially empty pallet can be shipped. When these partial or mixed pallets are formed, they are then sent to staging area 180 and finally to truck loading area 174. Thus, a warehouse 172 and staging area 180 are both required. Moreover, manual order picking is carried out in order to load the customized pallets sent to the staging area 180.

This current system has problems in that increased storage capacity is needed and a lot of manual labor is required in forming the customizing pallets. Moreover, increased time is required because palletized load cannot be directly loaded onto the trucks when there are customized orders. Also, there can be errors when manually customizing the pallet. Thus, improvements in this current process flow are needed.

Figure 9:
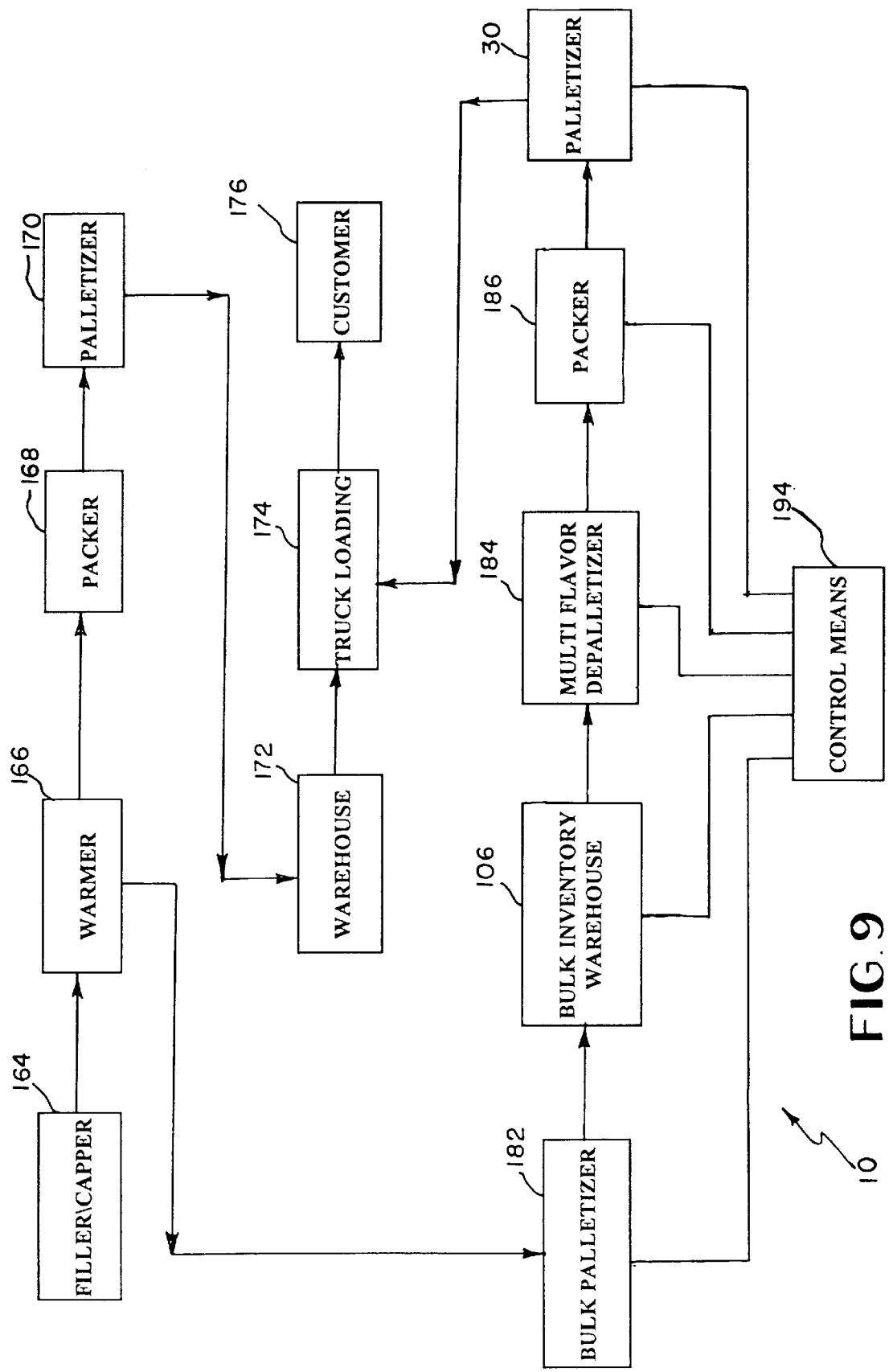
FIG. 9 is a flowchart indicated the process flow of the present invention.

Turning now to FIG. 9, a flowchart showing one arrangement for the system 10 of the present invention is shown. Similarly to the conventional arrangement shown in FIG. 8, the present invention moves articles such as beverage containers from the filler/capper 164 to the warmer 166 to the packer 168 to the palletizer 170 to a warehouse 172 then onto truck loading 174 and finally to the customer 176. This is carried out when full pallets are shipped to a customer. However, when. only a partial pallet or a mixed pallet should be sent to the customer, then the articles such as the beverage containers can move from the warmer 166 to the bulk palletizer 182. Such a bulk palletizer 182 can be thought of as the previously described high volume module 22, low volume module 24 and/or prepackaged module 28. This bulk material is stored in a warehouse, for example, such indicated in step 106.

The bulk articles such as loose cans are removed from the pallet as indicated by the multi-flavor depalletizing step 184. This step can include actions undertaken in the high volume module 22 and low volume module 24. The articles are then sent to a packer as indicated in step 186. This packer could be the sorting and packing module 26 previously described. The articles are then finally sent to a palletizer step 188 which could be a palletizer used in the mixed palletizer module 30 as previously discussed. The articles from the palletizer step 188 can be directly loaded onto the truck at step 174. This direct loading has previously been discussed with regard to FIG. 7. This direct loading avoids the need for extensive, if any, warehousing of the mixed loads. In fact, the entire system 10 could be used instead of the separate packer step 168, palletizer step 170 and warehousing step 172. In particular, the system 10 of the present invention could be used to fill mixed palletized orders as well as single unit palletized orders as discussed above. In such an arrangement, articles such as beverages could move from the warmer 166 to the bulk palletizer step 182 and on through the process to direct truck loading 174. The warehousing step 172 could then be omitted. Substantial savings in cost and space could be obtained. Also, due to the automation of customized order picking, errors resulting from manual picking can be avoided. The number of workers can also be reduced and therefore cost savings would accrue. Also, it is possible to have just-in-time order delivery as discussed above. The present system 10 will open production capability for mixed multi-packs and for mixed pallet order picking. It is possible to easily package customer orders and the possibility to further customize orders is provided.

As noted above, the warehouse 106 can be a separate warehouse facility or can actually be at a bottling plant, for example. Therefore, shipping and handling of the: articles such as bottles, cans or beverage boxes can be reduced and the potential to damage such articles can also be reduced. Because articles can be filled on a pallet from the warmer 166, and due to the use of the sorting and packaging module 26, the ability to meet a customer's orders can be increased. There will be few out of stocks because the orders can be packaged directly as the customer desires rather than picking and sorting between existing filled pallet stocks.

In the present system 10, orders can be entered electronically thereby becoming the driver's production. This can reduce errors. With the present system 10, orders can be input into the control means 194 from the various customers. The control means 194 will then combine the orders for each truck 164 and sequence order fulfillment according to a production sequence. The production sequence will determine an amount of pallets to be loaded onto a truck and determine an order delivery of pallets.

The control means 194 will arrange for each truck load of orders to be output from the system in reverse order. An order can consist of one or more pallet loads 160 for a customer, such as an individual store. This reverse output of orders will result in the last load to be delivered being output first from the system 10 such that it will be loaded on the truck 164 first. This load will be furthest from the door(s) of the truck. The first load to be delivered will be output last from the system 10 such that it will be the last load placed on the truck.

When the truck 164 reaches its various destinations, the driver will not have to shuffle loads. The order for the first customer will be readily accessible. Moreover, the pallet load(s) 160 for each customer will already be arranged such that the truck driver will not have to shuffle packages between pallets. This will speed delivery, making the delivery truck driver more efficient. Also, the potential for damage to the goods resulting from multiple handling thereof would be reduced. The potential for delivery of a wrong order or wrong partial order is also reduced. Other benefits occur due to this organization of the loads placed on the delivery truck 164.

While the flowchart of FIG. 9 shows articles moving from a warmer 166 to a bulk palletizer step 182, it should be appreciated that the articles supplied to the bulk palletizer step 182 could actually come from any source. For example, if beverage containers such as cans, bottles, beverage boxes, etc. are being handled then they can be supplied from another step in the process. Also, if articles other than beverage containers are being handled, they could be supplied from an appropriate step to the system 10 of the present invention.

Figure 10:
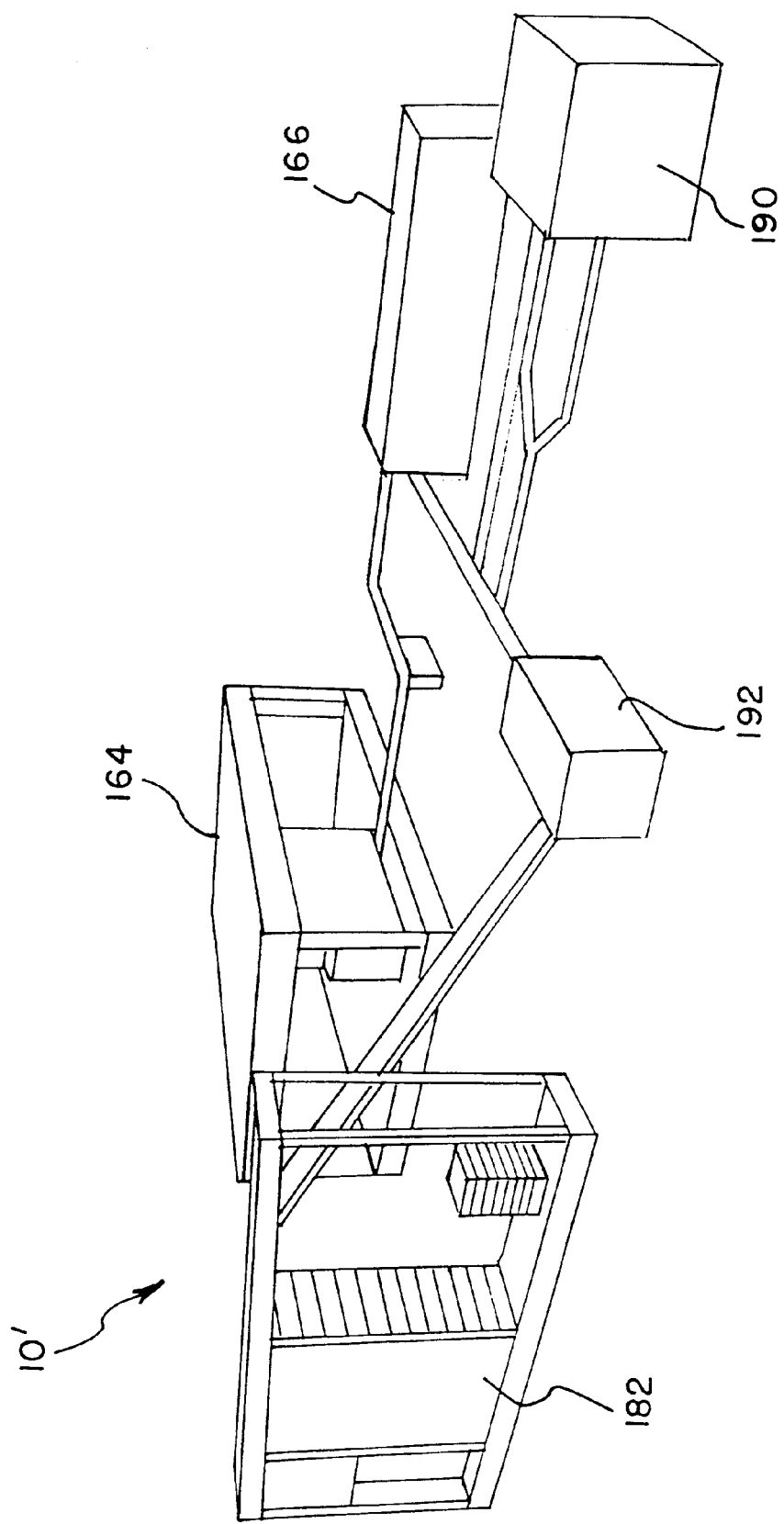
FIG. 10 is a perspective, schematic view of a second embodiment of the present invention.

Turning now from FIG. 9 to FIG. 10, a schematic diagram of a second embodiment of the system 181 of the present invention is shown. In this schematic diagram of FIG. 10, various devices for the filler/capper 164, warmer 166 and packer 168 are indicated.

Articles such as beverage cans, bottles or beverage boxes leave the filler 164 and travel through the warmer 166. They then exit this warmer 166 and normally travel to the fil-tec 190 and on to secondary packaging. Such a conventional filling line in the embodiment of FIG. 10 can include the additional equipment of a fil-tec 192, bulk palletizer 182 plus the additional conveyor equipment. As seen in FIG. 10, the articles such as cans, bottles or beverage boxes travel upwardly from the fil-tec 192 to the top of the bulk palletizer 182. The bulk palletizer 182 places cans, bottles, beverage boxes or other articles on the pallets loose. The bulk pallets are then stored in the bulk warehouse 106 for later use.

A computer or other control means 194 is indicated in FIG. 9 as being connected with the bulk palletizer 182 and other equipment. This control means 194 can cause pallets to be loaded in the bulk palletizer in a certain manner. The articles will be palletized according to the principle of cases on the bottom and six packs on the top, for example, when handling beverage containers. Of course, any suitable palletizing arrangement could be used.

The control means 194 will also send instructions to the bulk inventory warehouse about which articles are to be loaded into the multi-flavor depalletizer 184. The packer 186 and palletizer 188 can also be controlled through this control means 194. Of course, any of the other upstream operations such as the fill/capper 164, warmer 166, packer 168, palletizer 170, etc. could be controlled through the control means 194. An input is also provided to the control means 194 for loading information about arrival and departures of trucks in the truck loading areas 174. In this manner, it will be possible to properly sequence orders. Customer orders can also be input to this control means 194. The present system. 101 enables a bottler, for example, to fill specific customer orders by producing both mixed pallets and mixed multi-packs according to the individual orders.

As discussed above, many of the devices used in the system 10 can be under the control of means 194. The control means 194 can be a warehouse management system and system controller. A computer can be used as the control means 194. An appropriate data highway will be necessary and inputs for order entry will be necessary as noted above. This control means 194 can carry out order sequencing and queuing and wrap feed staging. Also, packaging, sequential case merging and palletizing can be provided. A printer or other appropriate device can be provided for outputting pallet identification labels if so desired. Schedule information for the trucks 162 should also be inputted into the control means 194 in order to plan for delivery of palletized articles directly to the truck as noted above. The control means 194 can also be used for truck assignment. This control means 194 can also be used for replenishment requirements.

Control means 194 will control merges, product quality assurance and can provide for real time system diagnostics. The instant system 10, as well as the second embodiment system 10' (to be discussed later) will permit flexible order building and improved packaging, warehousing, order picking, merchandizing and marketing by postponing secondary packaging decisions until order fulfillment. Production will be based on flavor not packages therefore reducing warehousing requirements avoiding multihandlings of articles and reducing cost.

Returning to the system 10 as shown in FIGS. 1–3, it should be appreciated that mixed multi-pack pallets can be formed with the present system. As noted above, a twenty-four pack 148, twelve pack 150 or tray of six packs from a tray packer 46 can be fed via conveyor 12 to the mixed palletizer module 30. Also, the prepackaged module 28 can feed prepackaged return or imported products directly to the mixed palletizer module 30. The palletizer will then form stacks of articles on a pallet. All the same type and size of articles can be packaged on a pallet or different configurations can be packaged on the pallet. The palletizer 156 can stack products according to the principle of cases on the bottom and six packs on the top, for example. Of course, any suitable stacking criteria can be used as noted above. In this manner, different types of sized products can be delivered to the pallets. Also, different varieties such as different beverage flavor containers can be delivered to the palletizer. Therefore, with the present invention it is possible to have mixed pallet orders.

Also, with the present invention, it is possible to provide for mixed multi-packs. In particular, different flavor beverages can be stored in the various accumulators 32 in the high volume module 22 and in the staging areas 88 of the low volume module 24. As noted above, a single run of all of the same type of article can be dispensed to the sorting and packaging module 26. However, it is possible to send different groups of articles. For example, in FIG. 1, the left-handmost accumulation equipment 32 can dispense cans of Coke™, for example. The conveyor belt 64 for this accumulation of equipment 32 is labeled A. The next accumulation equipment with the conveyor B can dispense Sprite™. Next, the accumulation equipment associated with conveyor C could dispense Diet Coke™, for example. With the present invention, it is possible for the single filler unit 66 and the star wheel associated with conveyor A to dispense four cans of Coke™, for example. Then, the next single flow unit and star wheel 38 can dispense four cans of Sprite™. Finally, the next single filler unit 66 and star wheel 38 associated with conveyor C could dispense four cans of Diet Coke™. These three groups each of Coke™, Diet Coke™ and Sprite™ can then be fed via conveyor 12 to the storing and packaging module 26. The first laner 40 would divert these cans to lane 128 shown in FIG. 2. The third laner would then divide the cans into the four divided lanes 146. The wrapper 44 could then wrap all twelve cans in order to form a twelve pack 150. This twelve pack 150 would have the four cans of Coke™, four cans of Sprite™ and four cans of Diet Coke™ therein. Accordingly, it is possible to therefore produce a mixed multi-pack with the present invention.

It is important to realize that not only mixed twelve packs but mixed six packs, mixed twenty-four packs or any sized mixed pack could be formed. Moreover, while handling Sprite™, Coke™ and Diet Coke™ have been discussed, it should be appreciated that any number of articles could be handled. For example, other beverage cans, beverage boxes, beverage bottles, cans of food or any other suitable article could be handled in the present system.

Moreover, while it was discussed that four articles of each group were dispensed, it could be possible that three articles from four different groups could be dispensed to the twelve pack wrapper 44. Other combinations of articles both in size and type are contemplated. Therefore there is great flexibility with the present system. Accordingly, it is now possible with the present system 10 to provide for mixed multi-packs. While these mixed multi-packs are shown as being fed to conveyor 12 and then to the palletizer 156, it should be understood that a diverter conveyor could be provided in order to send these mixed multi-packs to a storage facility. With the present invention, however, it is possible to quickly fill particular orders for mixed multi-packs and then place them on a pallet for quick shipment to a customer. The previously noted control means 194 can control sequencing of the various equipment to produce these mixed multi-packs.

Figure 11:
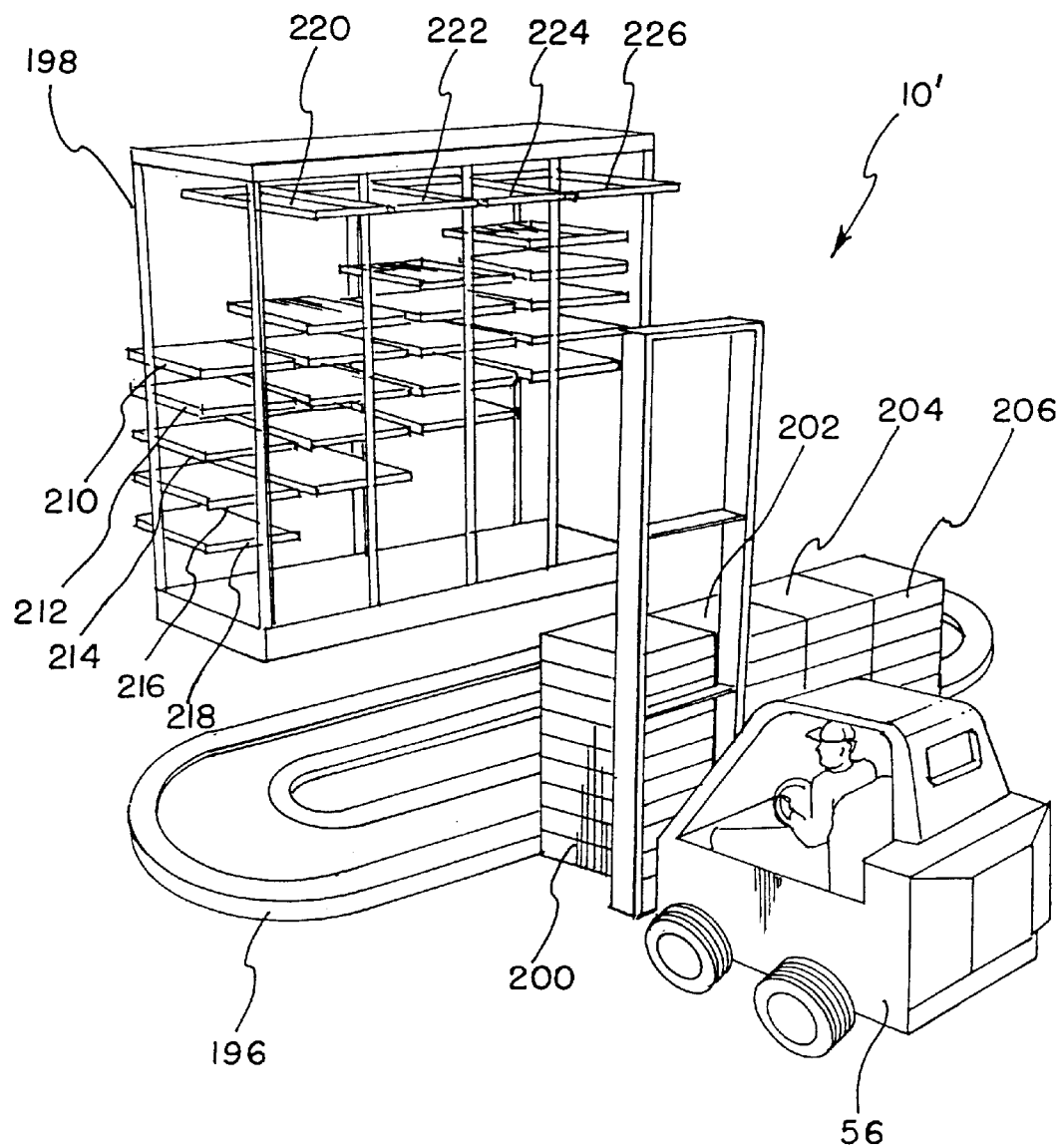
FIG. 11 is a perspective view of a carrousel and elevator bank of the second embodiment of the system of the present invention.

Rather than using the various modules 22, 24, 26 and 28, a second arrangement is possible as will now be discussed with regard to FIGS. 11–14. This modified system 10' takes containers in bulk from the bulk palletizer 182 as shown in FIG. 10, for example. These bulk pallets can be individual cans stacked on the pallet or any other suitable container arrangement. A fork lift 56 is shown in FIG. 11 for transferring the bulk pallet. Of course, a conveyor, an overhead crane or any other suitable transfer arrangement could be used. The bulk pallets are delivered to a carrousel 196 which is rotatable either in a clockwise or counterclockwise direction. This carrousel 196 is positioned in front of a plurality of elevators in elevator bank 198. Of course, rather than using a separate rotatable carrousel 196, a conveyor which directly transports the bulk pallets from the bulk palletizer 182 could move these bulk pallets in front of the elevator bank 198. Also, other input arrangements such as directly moving the groups of articles from the fil-tec 192 to an area in front of the elevator bank 198 is possible. This step would avoid the need for palletizing and then depalletizing the articles.

Figure 12:
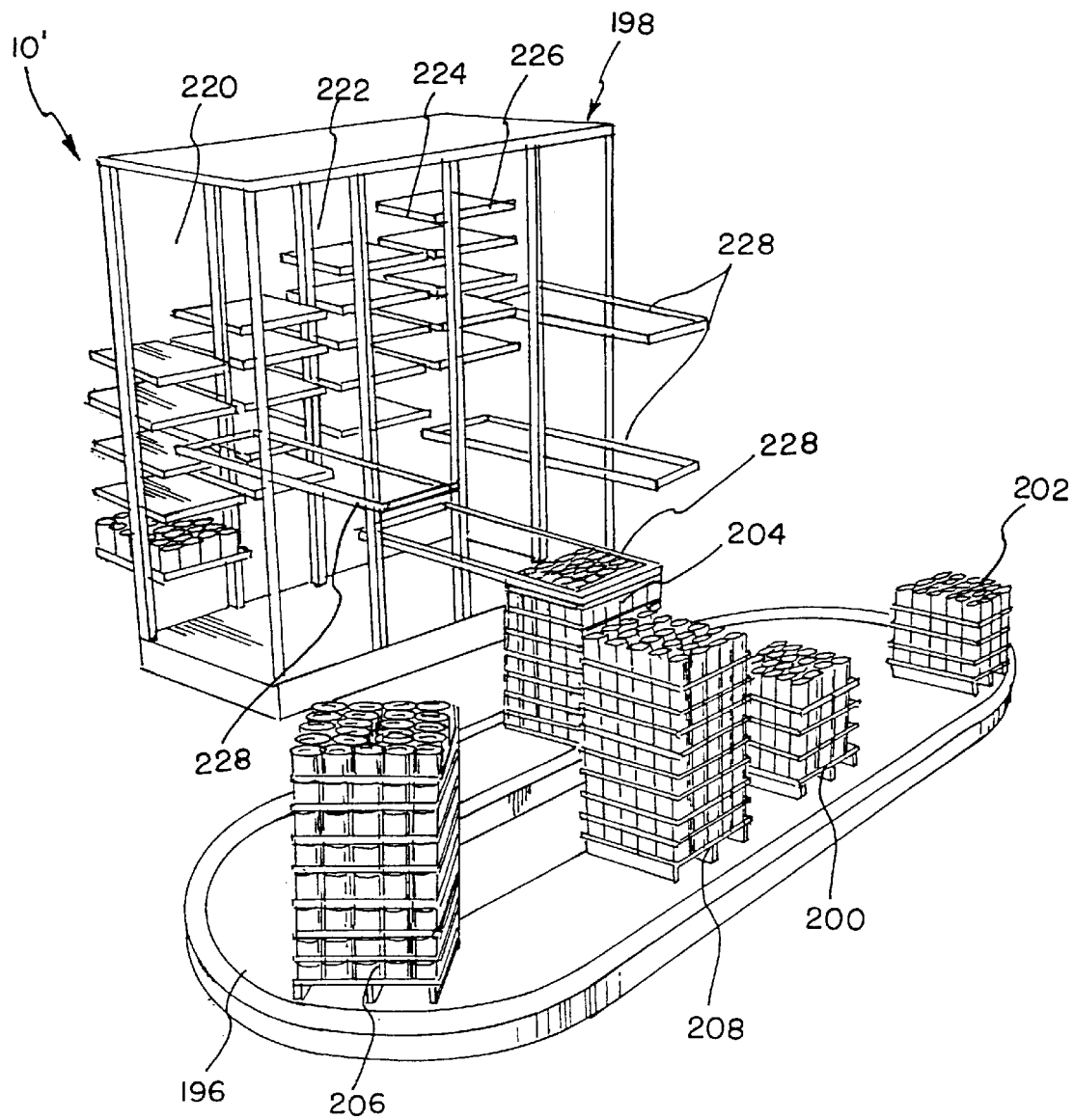
FIG. 12 is a perspective view of the carrousel, elevator bank and transfer device of the second embodiment of system of the present invention.

Nonetheless, as shown in FIG. 11, a rotatable carrousel 196 is shown. This carrousel can be rotated in a clockwise or counterclockwise direction. Four bulk loads 200, 202, 204 and 206 are shown at carrousel 196 in FIG. 11. The bulk load 200 is being loaded onto the carrousel 196 by fork lift 56. As indicated in FIG. 12, this carrousel 196 will eventually have five bulk loads 200, 202, 204, 206 and 208. It is contemplated that each bulk pallet will have the same type of article such as the same flavor of beverage container. Different levels of articles are stacked on each pallet in the bulk load.

The number of pallets on the carrousel 196 corresponds to the number of levels in each elevator in the elevator bank 198. In particular, five levels 210, 212, 214, 216 and 218 are provided for each of the elevators 220, 222, 224 and 226 in the elevator bank 198. While four elevators are shown each with five levels, it is contemplated that any number of elevators and any number of levels per elevator can be utilized in the present invention. The levels in each elevator are spaced a predetermined, fixed distance from one another. The levels on each elevator are simultaneously vertically reciprocated with the up and down movement of the elevator. Each elevator 220, 222, 224 and 226 is independently movable relative to one another.

In FIG. 12, a transfer device 228 can be seen for each of the elevators 220, 222, 224 and 226. Each of the transfer devices 228 is independently movable relative to one another and relative to-their adjacent individual elevator. Each transfer device 228 also has a gripper head for gripping a whole layer of loose cans, for example, from a layer on each pallet. Of course, bottles, beverage boxes or other articles could be handled. The gripper head reciprocates from a position over the carrousel 196 to a position over the individual levels in the adjacent elevator.

As can be seen in FIG. 12, four levels of articles have been removed from the bulk pallets 200 and 202. One level from the bulk pallet 204 has already been placed on the fifth level 218 of the first elevator 220. The transfer device 228 of the second elevator 222 is removing the next layer of articles from the bulk pallet 204 to be placed on the fifth level 218 of the elevator 222. Each of the fifth levels of the elevator 220, 222, 224 and 226 will be loaded with a layer of article from the bulk pallet 204. The transfer device 228 for each elevator will move that layer of articles onto the respective elevator. The carrousel 196 will also move the bulk pallets 206 and 208 to positions in front of the elevator bank 198. The transfer devices 228 can then also unload layers of articles onto the upper levels 210 and 212 of each individual elevator.

This loading sequence can be varied if so desired. For example, all of the levels 210, 212, 214, 216 and 218 of the first elevator 220 can be loaded before the levels of the next elevator 222 are loaded. Other loading sequences are possible. Moreover, rather than holding the levels of the elevators fixed when transferring the articles from the bulk pallets to the individual layers, it is possible that the transfer device 228 only moves horizontally. In such an arrangement, it would then be necessary for each level of the elevator to be movable to a lower position such that the transfer device 228 can merely pick up and slide a layer of articles onto to an adjacent level 210, 212, 214, 216 or 218. In such a modified arrangement, slight lifting of the layer of articles is possible with the transfer device in order to avoid any interference between adjacent layers.

While five levels 210, 212, 214, 216 and 218 and four individual elevators 220, 222, 224 and 226 are shown, any number of levels and any number of elevators can be used. Moreover, while five different bulk pallets 200, 202, 204, 206 and 208 are shown for supplying different articles to each level 210, 212, 214, 216 and 218, it is possible that a pallet can deliver articles to different levels of the same elevator. Great flexibility is provided with the present invention.

Prior to delivering the bulk pallets 202, 204, 206 and 208 to the carrousel 196, the control means 194 compiles all orders to be processed and then generates a production sequence. Based on this production sequence, the bulk pallets can be loaded onto the carrousel 196. The carrousel 196 will then rotate to place each pallet so that it is in front of the transfer device 228 for each of the individual elevators of the elevator bank 198. As set forth above, the transfer device can grip a whole layer of loose articles such as cans from each pallet. If it is possible, however, that the transfer device 228 can grip less than a whole layer of articles or can grip some form of packaged articles.

As noted above, the articles will then be transferred onto the correct level 210, 212, 214, 216 and 218 of each of the individual elevators 220, 222, 224 and 226. It is contemplated that this arrangement will result in each level of the elevators being fully loaded with loose articles such as cans, bottles or beverage boxes with one flavor per level. The elevator concept of the system 10' provides for quick and simple change of product going into the packer 230 shown in FIG. 14 as will be described below.

Figure 13:
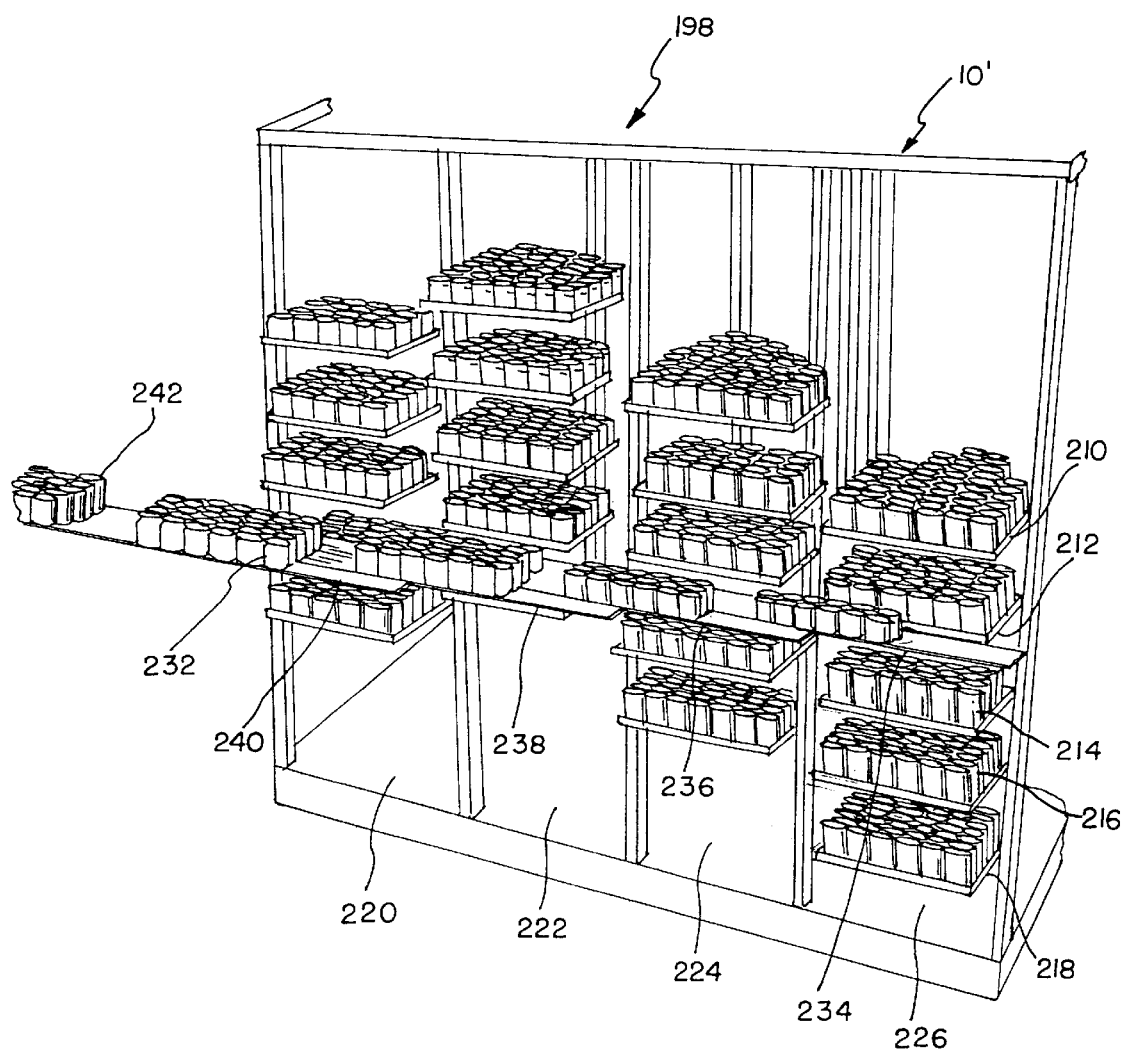
FIG. 13 is a perspective view of the elevator bank and conveyor of the second embodiment of the present invention.

However, first turning to FIG. 13, a fully loaded bank of elevators 198 is shown. A four lane conveyor 232 is shown in front of the elevator bank. In FIG. 13, however, the transfer device 228 is not shown in order to simplify the drawings. Also, the carrousel 196 is omitted simply for clarity.

The four lane conveyor has a first lane 234, a second lane 236, third lane 238 and a fourth lane 240. The first lane 234 extends past each of the elevators and terminates in front of elevator 226. The second lane 236 extends to the elevator 224. The spacing of the elevators can be staggered such that the elevator 226 extends more forwardly than the elevator 224. This jag in the elevator spacing can accommodate different distances between the levels on the elevators and the lanes of the conveyor 232. Alternatively, the elevators can be positioned in the same plane and an appropriate transfer arrangement can be provided for moving articles from the levels of the elevator to the conveyor 232.

The third lane 238 of the conveyor 232 extends past the elevator 220 to the elevator 222. Finally, the fourth lane 240 extends to the front of the elevator 220. In this manner, the first elevator 226 will discharge articles to lane 234, the elevator 224 will discharge to lane 236 and so forth. As seen on the left-hand side of FIG. 13, four rows of articles are moving along the conveyor 232. These four rows of articles have a length corresponding to the length of one row of articles on a level of the elevator. Therefore, elevator 226, for example, will discharge all of the front row of articles onto lane 234. However, a different discharging arrangement could be provided such that any suitable number of articles can be discharged. For example, a release mechanism could be provided for only discharging some of the cans.

The levels 210, 212, 214, 216 and 218 of each of the elevator in FIG. 13 are shown as being horizontal. However, these levels can be inclined towards the conveyor 232 in order to provide a gravity assist for discharging the articles onto the conveyor 232. Also, the levels of each elevator could have a powered conveyor or other assist device for moving the cans at the rear of the level -towards the four lane conveyor 232.

Each elevator 220, 222, 224 and 226 has five levels 210, 212, 214, 216 and 218 as previously noted. The elevators 220, 222, 224 and 226 are independently movable relative to one another. The control means 194 can control the vertical movement and the discharging of the elevators in the elevator bank 198. In operation, the lowermost level 218 of the right-hand elevator 226 can be raised to be level with the first lane 234. Then the first row of articles such as cans, bottles, beverage boxes can be dispensed onto the first lane 234. Simultaneously or soon thereafter, the next elevator 224 can be raised such that the lowermost level 218 is also adjacent the second lane 236. When the articles discharged onto lane 234 are adjacent the discharge area for lane 236, the articles can be released from the level 218 of the elevator 224 such that a group of articles having two rows is formed. This process can continue such that the lowermost level 218 of the elevators 222 and 220 are. also positioned adjacent the respective lanes 238 and 240. As the two row pack moves past elevator 222, the articles can be dispensed from this elevator to form a three-row pack. Then, as the three-row pack moves passed the last elevator 220, the last row of articles can be dispensed thereby forming four rows of articles on the conveyor 232.

Because it is contemplated that a particular level throughout the elevators will have the same product, this described arrangement will result in a group of all of the same type of articles being formed. For example, cans of Coke™ can be positioned on level 218 on each of the elevators 220, 222, 224 and 226. In this above-described discharge arrangement, the four rows of articles eventually positioned on the four layer conveyor 232 will consist of four rows of Coke™. Therefore, a uniform package of articles can be provided.

On the other hand, it is possible that the elevator 226 discharge a row of articles from level 218 while the next elevator 224 discharges a row of articles from another level such as 216, for example. The next elevator 222 can then discharge articles from level 214 while the last elevator 220 discharges articles from level 212, for example. Then four different types of articles would be provided in the grouping on conveyor 232 when each of these different levels 218, 216, 214 and 212 contain different types of articles. In a next dispensing cycle, for example, articles from level 210 can be dispensed from elevator 226, articles from level 212 can be dispensed from elevator 224, articles from level 210 can be dispensed from elevator 222 and articles from level 218 can be dispensed from elevator 220. These dispensing arrangements are merely illustrative of the great flexibility provided with the instant system 10'. It should be appreciated that the control means 194 can permit discharge of any desired grouping of articles from the five different layers of the elevators. Moreover, while it is shown that an entire row of articles is simultaneously dispensed from one level of each elevator, any suitable number of articles could be dispensed. It is contemplated that each elevator 220, 222, 224 and 226 will dispense the same number of articles per cycle. This provides for uniform groupings on the downstream conveyor 232.

As each individual elevator 220, 222, 224 and 226 vertically reciprocates, different levels 210, 212, 214, 216 and 218 will be brought adjacent the respective lanes of the conveyor 232. Therefore, it is possible to dispense many types of groups of articles to the conveyor. It is contemplated that each level 210, 212, 214, 216 and 218 of an individual elevator will simultaneously move thereby keeping a predetermined spacing therebetween. Therefore, when level 218, for example, is raised to the level of lane 234 the other levels 210, 212, 214 and 216 of the elevator 226 would be raised above conveyor 232. The articles are properly sequenced based on each order being processed by control means 194.

Figure 14:
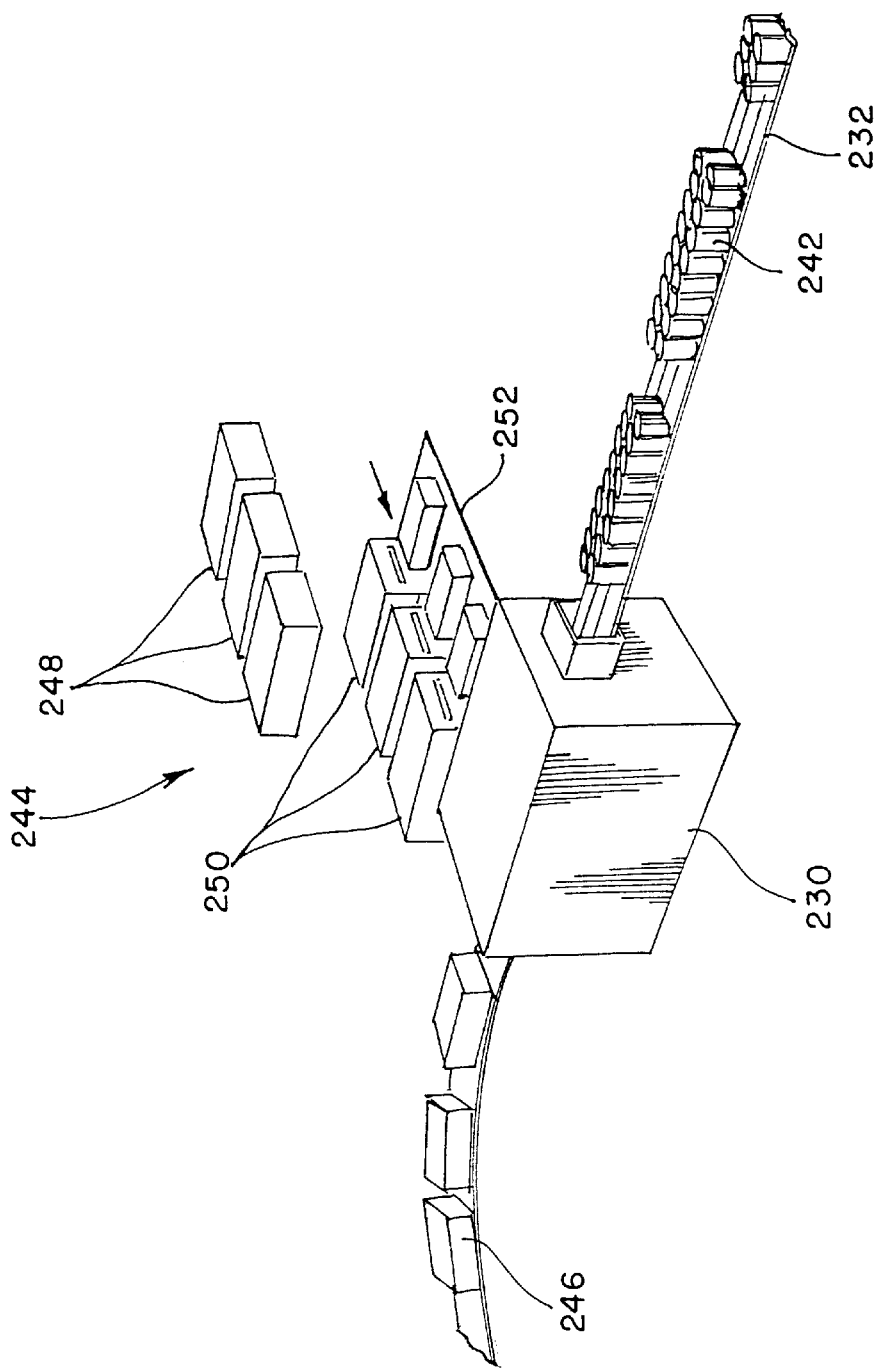
FIG. 14 is a perspective view of the wrapper of the second embodiment of the system of the present invention.

The conveyor 232 feeds groups 242 to a packer 230 as seen in FIG. 14. The bank of elevator 198 allows quick and simple change of product going to the packer 230. The packer 230 can produce packages of any flavor at any time. This is how a mixed pallet is produced. By varying the flavors or types of articles on each of the four conveyor lanes 234, 236, 238 and 240, the packer 230 can produce a mixed multi-pack. A series of magazine style holders 244 feed wraps to the packer 230 so that each order can be correctly packaged. The packaged products 246 can continue to move downstream to the palletizer where then can be stacked and directly loaded onto a truck. Alternatively, it is possible to stack these products and load them in a warehouse or otherwise store them.

The packer 230 of FIG. 14 receives wrapper from the magazine style holders 244. These holders 244 include overhead holders 248 and side holders 250. In particular, wraps for the article can be dropped onto conveyor 252 from the overhead holders 248 and fed to the packer 230. These overhead holders 248 can be simultaneously activated or activated in any sequence. For example, the rearmost holder 248 can be repeatedly activated when incoming groups 242 of the same articles are sequentially infed to the packer 230. Apart from the overhead holders 248, side holders 250 are also provided. These side holders 250 shoot wraps from their top outlet onto the conveyor 252. These wraps are then infed into the packer 230. The overhead holders 248 and side holders 250 enable the packer 230 to be continuously supplied with wrappers in order to accommodate the incoming groups 242 or articles on conveyor. 232. The wrapper articles leave the packer 230 as indicated by packaged product groups 246.

While six magazines are shown in FIG. 14, it should be appreciated that any number of magazines can be provided. It is contemplated that each magazine will only dispense a single type of wrapper but a magazine could be arranged to dispense different types of wrappers. It is also possible to use remote wrapper holders. For example, a shelving design could hold thirty, a hundred or any desired number of types of wrappers. One or more robotic order pickers can be provided for removing one or more wrappers from the shelves. The control means 194 can instruct the robotic order pickers on the sequence of orders incoming to the packer 230. The robotic order pickers can then pull the needed number and type of wrappers while placing them in the proper sequence. Bundles of properly sequenced wrappers can then be fed to the packer 230 in anticipation of the incoming orders. Instead of using automated robotic order pickers, the system could, of course, use manual order picking for supply of the wrappers. Many other types of arrangements for providing the wrappers are possible in the instant systems 10' and 10.

Moreover, it should be appreciated that the bank of elevators 198 can feed articles to the packer 230 of all the same type for a particular group or a group can be mixed. In FIG. 13, five levels 210, 212, 214, 216 and 218 are provided for each of the elevators. Therefore, it is possible that five different groups all having the same type of article could be fed to the packer 230. Therefore, at least five wrappers should be provided for accommodating these groups. It is possible as noted above, however, to form a mixed multi-pack pack. Therefore, a group of articles 242 approaching the packer 230 may have different group types of articles. Therefore, at least one of the holder 244 should be provided for wrapping these mixed multi-packs.

It is contemplated that the packer 230 can package six packs, twelve packs, twenty-four packs or any suitably sized package article. Therefore, the groups of packaged products 246 fed from the packer 230 can also be varied.

It is contemplated that the present system 10 or 10' can package 50 cases per minute, for example. The present invention provides for great flexibility which heretofore has been unavailable in the art.

The present system 10, 10' can reduce cycle time for example, by 50%. A single flavor package, for example, can be treated as the base unit. This can reduce the number of stock keeping units, reduce potential out-of-stocks and reduce warehousing requirements. The order picking errors can be reduced due to automation of the system and potential savings can accrue. It is possible to customize orders and provide great flexibility in packaging. A single pallet can have different sized packages such as six packs, twelve packs and twenty-four packs placed thereon. Also, an individual pack can be formed with different types of articles such as different flavored beverages. Therefore, a mixed multi-pack can easily be formed with the present system 10, 10'. It is therefore easy to customize orders. Also if new packages are introduced, it is easy to configure the articles into these new packages. For example, if for some reason an eighteen pack became the market standard, the system could easily be accommodated to provide such packages. Therefore, there is great flexibility with the present system.

Due to the just-in-time order fulfillment, secondary packaging decisions can be postponed until order fulfillment. Therefore, if there is some seasonal pack wrapping, for example, it can be applied just before the packages are sent. Therefore, a warehouse with wrapper articles which are no longer is season can be avoided. It is possible to quickly change promotions and to customize packages for a particular market. Therefore the appeal of the packaged goods can greatly be increased. There is a lot of ability to support marketing initiatives with the present system 10, 10'.

Also, the filler 164 utilization can be improved with the present system. Packaging and handling of articles can easily be carried out with the filler running at maximum capacity. In addition, if new types of articles such as a new beverage are added to a product brand, then the present invention provides for such growth capacity. For example, additional accumulation equipment 32 could be added to the high volume module 22 for a total of seven pieces of equipment 32, for example. This easy addition of equipment allows the system 10, 10' to readily grow and accommodate change. Alternatively, the arrangement of articles in an existing module can be easily altered. For example, if some article has increased sales, it is easy to shift the placement of this article from the low volume module 24 to the high volume module 22, for example. Also, an article can be introduced through the prepackaged module 28 if so desired. In the system 10', articles loaded onto the bank of elevators 198 are easily varied depending upon the pallets loaded onto the carrousel 196. If needed, an additional elevator can be added to the bank 198 or the number of levels per elevator could also be increased. Therefore great flexibility is provided with the present system 10, 10'.

The order picking palletizing system of the present invention has great flexibility in its location. It can be at a production site instead of at a distribution center if so desired. Therefore, a need to temporarily package articles, move them to a distribution center and then repalletize them can be avoided. By reducing the number of time an article has to be handled, cost can be reduced and the potential for damaging articles can be reduced. Moreover, it is possible to avoid a lot of warehousing of articles in the present invention. In particular, stacked pallets can be loaded directly on the truck 162 as previously noted. While some loaded pallets may be temporarily stored for delivery on the truck 162, the need for a large storage area can be avoided. This also reduces cost and improves the efficiency over the overall system 10, 10'.

Figure 15:
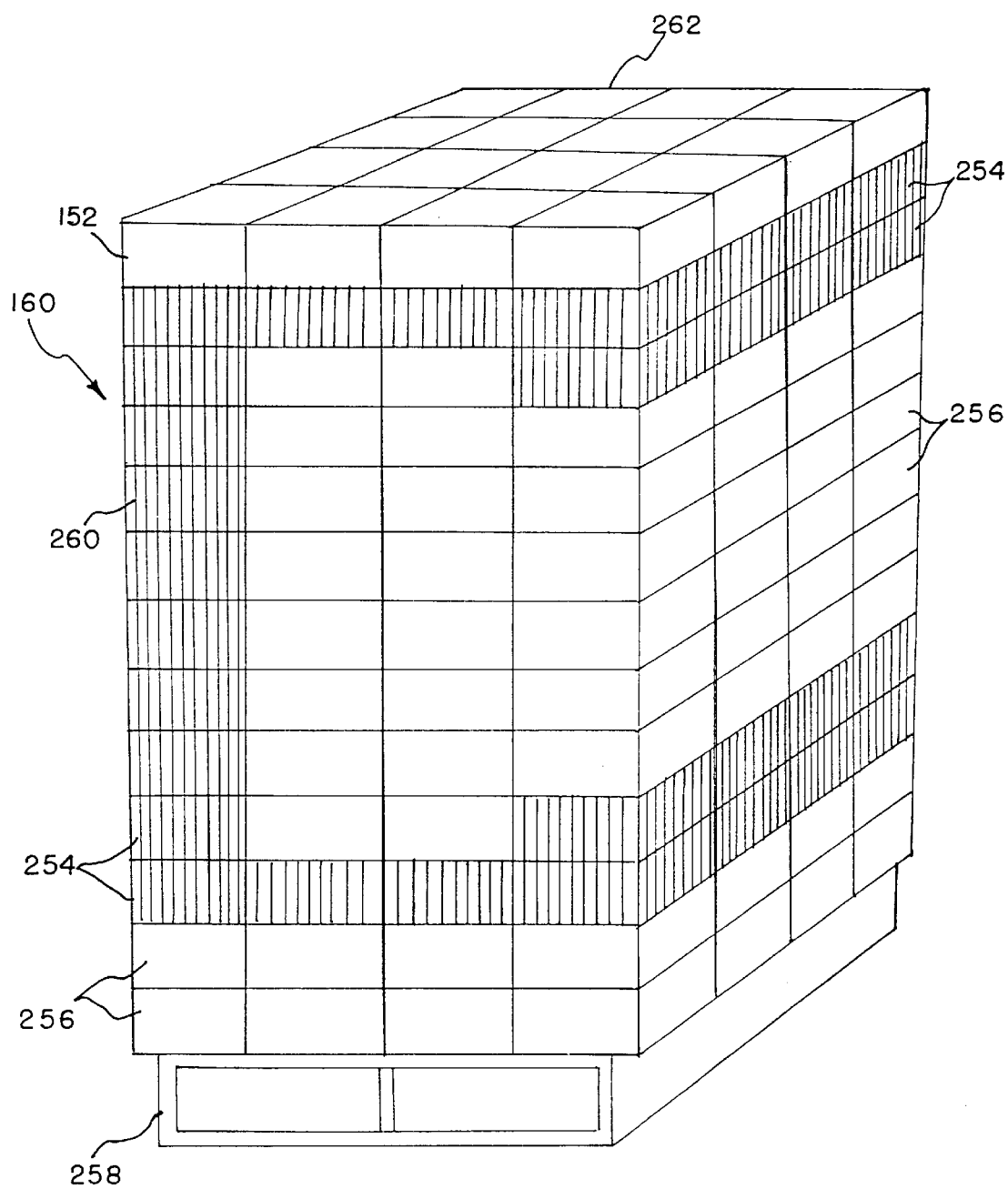
FIG. 15 is a perspective view of a pallet with articles loaded to form a selected design.

Marketing initiatives can be supported by the present system 10, 10' as indicated, for example, in FIG. 15. FIG. 15 shows a pallet load 160 made up of individual six packs 152. Different brands of six packs can be used. For example, six packs of Coke™ 254 and six packs of Diet Coke™ 256 can be stacked on pallet 258. The six packs 254 generally have a red color as indicated by the hatching in FIG. 15. The other six packs 256 are generally white. These six packs 254, 256 can be stacked on pallet 258 in order to form certain designs or patterns in the stack of goods. In FIG. 15, a "C" is formed by the six packs. The control means 194 can control the feed of articles to the palletizer such that a suitable design can be formed in the stack.

It should be noted that this design extends completely through the stack as seen in the visible right-hand side of the stack in FIG. 15. Therefore, if a customer picks certain six packs from the pallet, the remaining six packs continue to form the design. In other words, the design is consistent from the front 260 to the rear 262 of the stack. A generally horizontal cross section through the stack will therefore have a consistent color pattern from the front 260 to the rear 262 of the stack. The control means 194 can feed articles to form alpha-numeric indicia or other designs with the contrasting colors of the articles. Rather than using six packs as the article, different sized packages could be used.

Moreover, it is contemplated that sequential pallets could be used to form words, for example. These pallets could then be delivered by truck 162 to a site and unloaded in order to spell the word. This marketing concept is easily supported by the present invention. While it has been known to form words with articles on different pallets, heretofore it has been necessary to manually stack these pallets in order to form the words. With the present system 10, 10', this process can automatically be carried out.

It should be noted that while generally red and white articles 254, 256 have been indicated in FIG. 15, any type of colored article can be used. It is the contrast between the different articles which results in the pattern or design. When forming sequential pallet loads 160, it is also possible for the pattern or design to continue from one pallet load to the next pallet load. Therefore, elaborate designs continuing from one pallet to the next pallet can be formed.

The present system 10, 10' provides order packing from a supply of individual articles. This supply of individual articles can include those articles held in the high volume module 22 and low volume module 24 of the system 10 and those articles held in the bank of elevators 198 of the second embodiment of the system 10'. A packaging subsystem includes the sorting and packing module 26 of the first embodiment 10 and the discharge lanes 210, 212, 214, 216 and 218 of the conveyor 242 with the packer 230 in the second embodiment of system 10'. A palletizer 156 is shown in the mixed palletizer module 30 of the system 10. The packages 246 fed through the packer 230 in the second embodiment of system 10' can be fed to a palletizer for stacking as noted above. This sequence is indicated for example in FIG. 9 by the indication of palletizer 30. The conveyor such as 12 and 232 along with the other associated conveyors make up a conveyor system for transporting the articles from the supply to the palletizer and for transporting the containers from the packaging subsystem to the palletizer in the-present system.

The present invention also provides for a method for order packing comprising the steps of supplying individual articles to conveyor system such as 12 or to 32. The articles are then transported to a packaging subsystem and the individual articles are packaged into containers of different sizes. The different sized containers have a different number of individual articles therein. These different sized containers are then transported from the packaging subsystem to a palletizer and are placed onto pallets in the palletizer. This method enables different size containers to be placed on a same pallet.

The present invention also provides for a system for order packing comprising a pack supply such as the prepackaged module 28 of the system 10. While not shown in FIG. 14, a prepackaged module could also supply packs of articles to the stream of articles leaving packer 230 in the system 10'. The high volume module 222 and low volume module 24 of the system 10 and the bank of elevators 198 of the system 10' comprising an article supply for supplying individual articles. As noted above, a packaging subsystem is provided for packaging individual articles. This packaging subsystem can include the sorting and packing module 26 of system 10 or the packer 230 of system 10'. The downstream palletizer will then palletize the packs of articles from both the pack supply and from the packaging subsystem., A conveyor system interconnects there various components. This system therefore provide for mixing prepackaged goods as well as goods packaged in the system on the same pallet.

The present invention also provides a method for carrying out this mixing of prepackaged packages and individual articles in the same system. This method comprises. the steps of supplying individual articles to the conveyor system. These articles are then transported by the conveyor system to a packaging subsystem such as the sorting and packaging module 26 of the first embodiment or the packer 230 of the second embodiment. A separate pack supply such as the prepackaged module 28 can be used to supply packs. As noted above, the system 10' can also have such a separate prepackaged module. These newly packaged articles as well as the prepackaged articles can then all be palletized by the palletizer.

The present invention also provides for a system for order picking have a priority arrangement. A supply of individual articles can be arranged in the high volume module 22 and low volume module 24 based on their use. A different amount of space is therefore provided for articles dependent upon the priority of the articles in the group. Means for feeding the articles can include the star wheel mechanism 38 and/or a gantry robot depalletizer 60, 90 for selectively feeding individual articles from one of the groups. Alternatively, the means for discharging articles from a level of one of the elevators in elevator bank 198 acts as a part of the means for feeding. A palletizer then can arrange these groups onto a pallet.

The present invention also provides for a method for prioritizing articles in an order packing system. This method includes the steps of supplying individual articles from an article supply such as the high volume module 22, low volume module 24 or bank of elevators 198. Depending upon the priority of an article, different amount of space can be provided in the system. The articles are then selectively fed from one of the groups and then palletized.

Along with this idea of prioritizing articles, it should be appreciated that the high volume module 22, for example, could handle the same type of articles in the two adjacent areas associated with conveyors 64A and 64B, for example. Then, within the high volume module 22, a higher priority article would have more space provided therefor. In the elevator bank 198, two levels on each elevator could be provided with a priority item. Therefore the present system can easily accommodate the need for an increased amount of a certain priority article.

The present invention also enables reduction of downstream storage requirements. For example, a method for avoiding warehousing of palletized articles is provided. This method includes the steps of feeding the articles to a palletizer such as 156. The articles are then palletized and loaded directly on a truck 162, as indicated, for example in FIG. 7. This will thereby reduce an amount of loaded pallets stored between the palletizing and loading steps to thereby minimize the storage space requirements.

Apart from minimizing the downstream storage requirements, upstream storage requirements can also be minimized. This is carried out by a method of reducing an amount of each type of different types of multi-stock keeping units in a warehouse. With the present invention, a single flavor package is treated as a base unit as previously noted. This avoids providing for stock keeping units of six packs, twelve packs, twenty-four packs, variety packs, etc. Rather, the individual articles become the stock keeping units. These stock keeping units can then be fed from a storage facility to the handling system. It is noted that some package modules are provided in the present system by the prepackaged module 28. Nonetheless, a majority of the articles handled can be individual articles such as individual beverage containers. When these individual beverage containers are fed to the handling system, the individual beverage containers are packaged into different sized containers in the storing and packing module 26. This will minimize the number of multi-stock keeping units required to be held upstream of the system. Similarly to the system 10, the system 10' of the second embodiment also reduces the upstream storage requirements by handling individual articles as the multi-stock keeping units. These articles are eventually wrapped into an appropriated sized package. The need to stock many different sized packages can therefore be avoided.

The present system also provides for a system and method for forming packages of beverages having different types of containers therein. In other words, a variety pack can be formed with the present system and method. A conveyor system such as 12 will feed a plurality of beverages to a packaging subsystem such as the sorting and packaging module 26 or the packer 230. There different types of beverages can be packaged into a same container. These packages are then discharged.

As shown in FIG. 15, the present invention also provides for a method for automatically forming a selected design in a stack 160 of articles. These articles are fed to a palletizer and are then stacked. The control means 194 can select the articles fed to the palletizer to result in the articles being stacked to form a certain design. This design is formed by at least the contrasting colors of the articles stacked on the pallet.

In addition, the present invention provides for a system 10' for order packing which includes a plurality of elevators 198. Each elevator has a plurality of levels 210, 212, 214, 216 and 218. While five levels have been shown and discussed, any number of levels can be provided for each elevator as noted above. A conveyor 232 feeds articles from the bank of elevators 198. The conveyor has at least one lane 234, 236, 238 and 240 for each elevator. Means are provided for discharging the articles from the elevators into the respective lanes.

The system 10' also provides for a method for order packing which comprises the steps of providing a plurality of elevators 198. Articles are held on the different levels 210, 212, 214, 216 and 218 of each elevator. Articles are then fed to a conveyor 232 which has at least one lane 234, 236, 238 and 240 for each elevator. The articles are discharged from the elevator to the respective lanes.

As noted above, the present system and method provides for great flexibility in order picking. The benefits of the present invention have heretofore not been obtainable in the prior art.

It should be noted that the marks "Coke"™, "Sprite"™, "Diet Coke"™, are registered trademarks of The Coca-Cola Company.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system for order packing comprising:
 a pack supply for supplying preformed packs, the packs containing a plurality of articles, the pack supply including,
  a plurality of groups configured to hold a selected type of preformed pack, and
  at least one depalletizer, the preformed packs being removed from one of the plurality of groups by the depalletizer;
 an article supply for supplying a plurality of types of individual articles;

a packaging subsystem for packaging the individual articles into packs;

a palletizer for palletizing the packs of articles from both the pack supply and from the packaging subsystem, the packs from the packaging subsystem and from the pack supply being placeable on a same pallet by the palletizer; and a conveyor system for transporting the articles from the article supply to the packaging subsystem, to transport the packs from the packaging subsystem to the palletizer, and to transport the packs from the pack supply to the palletizer.

2. The system for order packing as recited in claim 1, wherein the supply for supplying individual articles comprises at least one of a high volume module and a low volume module.

3. The system for order packing as recited in claim 1, wherein the packaging subsystem comprises a plurality of wrappers for wrapping the individual articles into a container, the conveyor system interconnects the plurality of wrappers.

4. The system for order packing as recited in claim 3, wherein the supply for supplying individual articles comprises at least one of a high volume module and a low volume module.

5. The system for order packing as recited in claim 1, wherein a plurality of types of individual articles are supplied by the article supply, and at least one of the packs of individual articles includes different types of the individual articles.

6. A method for order packing, comprising:

supplying at least one first type of individual article to a conveyor system at a first substantially continuous rate;

supplying at least one second type of individual article to the conveyor system at a second substantially continuous rate, the second substantially continuous rate being greater than the first substantially continuous rate;

transporting the individual articles on the conveyor system to a packaging subsystem;

packaging the individual articles in the packaging subsystem into packs, each pack having a plurality of articles;

providing a pack supply separate from the packaging subsystem;

conveying the packs of articles from the pack supply, from the packaging subsystem, and from the plurality of wrappers to a palletizer; and palletizing the packs of articles on a pallet with a palletizer, the packs from the packaging subsystem and from the pack supply being placeable on a same pallet by the palletizer.

7. The method for order packing as recited in claim 6, further comprising the step of holding a plurality of selected types of preformed packs in groups in the step of providing the pack supply, the method further including the steps of removing preformed packs from one of the groups and feeding the removed preformed pack to a conveyor system by at least one gantry depalletizer.

8. The method for order packing as recited in claim 6, further comprising the step of wrapping the individual articles into a container in one of a plurality of wrappers, the step of conveying includes conveying the containers from the wrappers to the palletizer.

9. The method for order packing as recited in claim 6, wherein the step of supplying includes supplying a plurality of types of individual articles, and the step for packaging includes packaging at least one pack having different types of the individual articles therein.

10. A system for forming packages of beverage containers having different types of beverage containers in each package, the system comprising:

a low volume module structured and arranged to supply at least one first type of beverage container at a first rate not exceeding a first maximum rate, and a high volume module structured and arranged to supply at least one second type of beverage container at a second rate not exceeding a second maximum rate, the second maximum rate being greater than the first maximum rate;

a conveyor system for feeding the first and second types of the beverage containers received from the low volume module and the high volume module;

a packaging subsystem for packaging the first and second types of beverage containers fed by the conveyor system into a same package; and means for discharging packages from the packaging subsystem.

11. the system for forming packages as recited in claims 10, wherein the conveyor system is configured to feed individual beverage containers from the supply to the packaging subsystem.

12. The system for forming packages as recited in claim 11, wherein the supply provides a different amount of space for groups of beverage containers depending upon a priority of the beverage containers in a particular group and wherein the system further comprises a palletizer for palletizing beverage containers fed from the means for discharging.

13. The system for forming packages as recited in claim 10, wherein the packaging subsystem is configured to package the beverage containers into different sized packages, the different sized packages having a different number of individual beverage containers therein.

14. The system for forming packages as recited in claim 13, further comprising a palletizer for palletizing the packages including the different sized packages, the different sized packages being placeable on a same pallet by the palletizer.

15. The system for forming packages as recited in claim 14, wherein the packaging subsystem comprises a plurality of wrappers for wrapping the individual beverage containers into the package, each of the wrappers wrapping one size of package and one type of package, the conveyor system interconnects the plurality of wrappers.

16. The system for forming packages as recited in claim 15, wherein the conveyor system supplies the beverage containers from the supply and includes a plurality of different conveyors within the packaging subsystem and wherein the packaging subsystem further comprising at least one laner, the at least one laner diverts beverage containers incoming from the supply on the conveyor system to one of the plurality of different conveyors in the packaging subsystem.

17. The system for forming packages as recited in claim 10, further comprising a prepackaged module for supplying preformed packs, the preformed packs containing a plurality of beverage containers, the means for discharging including a part of the conveyor system which interconnects both the packaging subsystem and the prepackaged module to a palletizer.

18. A method for forming packages of beverage containers having different types of beverage containers in each package, the method comprising:

supplying at least one first type of beverage container to a conveyor system at a first substantially continuous rate;

supplying at least one second type of beverage container to the conveyor system at a second substantially continuous rate, the second substantially continuous rate being greater than the first substantially continuous rate;

feeding the first and second types of the beverage containers to a packaging subsystem;

packaging the first and second types of the beverage containers into a same package in the packaging subsystem; and discharging packages from the packaging subsystem.

19. The method for forming packages as recited in claim 18, wherein the step of feeding supplies individual beverage containers to the packaging subsystem.

20. The method for forming packages as recited in claim 19, further comprising the step of packaging the beverage containers into different sized packages in the step of packaging, the different sized packages having a different number of individual beverage containers therein.

21. The method for forming packages as recited in claim 20, further comprising a palletizer for palletizing the packages including the different sized packages, the different sized packages being placeable on a same pallet by the palletizer.

22. The method for forming packages as recited in claim 20, further comprising the step of supplying preformed packs from a prepackaged module, the preformed packs containing a plurality of beverage containers, both the preformed packs and the different sized packages being stackable on the pallet by the palletizer, whereby at least the preformed packs and the different sized packages can be placed on a same pallet.

23. A system for order packing comprising:

a pack supply configured to supply preformed packs, the packs containing a plurality of articles;

an article supply configured to supply a plurality of types of individual articles;

a packaging subsystem configured to package the individual articles into packs, at least one of the packs including different types of the individual articles;

a palletizer configured to palletize the packs of articles from both the pack supply and from the packaging subsystem, packs from the packaging subsystem and from the pack supply being placeable on a same pallet by the palletizer; and a conveyor system configured to transport the articles from the article supply to the packaging subsystem, to transport the packs from the packaging subsystem to the palletizer, and to transport the packs from the pack supply to the palletizer, wherein the packaging subsystem includes a plurality of wrappers configured to wrap the individual articles into containers, the conveyor system interconnecting the plurality of wrappers.

24. The system for order packing as recited in claim 23, wherein the supply for supplying individual articles comprises at least one of a high volume module and a low volume module.

25. The system for order packing as recited in claim 23, wherein the packaging subsystem packages the individual articles into different sized packages, the different sized packages having a different number of individual articles therein.

26. The system for order packing as recited in claim 25, wherein the different sized packages are placeable on a same pallet by the palletizer.

27. The system for order packing as recited in claim 26, wherein the packaging subsystem comprises a plurality of wrappers for wrapping the individual articles into the package, each of the wrappers wrapping one size of package and one type of package, the conveyor system interconnecting the plurality of wrappers.

28. A method for order packing comprising the steps of:

supplying a plurality of types of individual articles to a conveyor system;

transporting the individual articles on the conveyor system to a packaging subsystem;

packaging the individual articles in the packaging subsystem into packs, each pack having a plurality of articles, and at least one of the packs having different types of the individual articles;

providing a pack supply separate from the packaging subsystem;

conveying the packs of articles from the pack supply and from the packaging subsystem to a palletizer; and palletizing the packs of articles on a pallet with a palletizer, packs from the packaging subsystem and from the pack supply being placeable on a same pallet by the palletizer, wherein said packaging includes packaging the individual articles into different sized packages, the different sized packages having a different number of individual articles therein.

29. The method for order packing as recited in claim 28, wherein the step of supplying individual articles comprises supplying articles from at least one of a high volume module and a low volume module.

30. The method for order packing as recited in claim 28, wherein the step of packaging includes wrapping the individual articles into a container in one of a plurality of wrappers.

31. The method for order packing as recited in claim 28, wherein the step of palletizing includes palletizing the packages including the different sized packages, the different sized packages being placeable on a same pallet by the palletizer.

32. A system for order packing comprising:

a pack supply for supplying preformed packs, the packs containing a plurality of articles;

an article supply for supplying a plurality of types of individual articles;

a packaging subsystem for packaging the individual articles into packs;

a palletizer for palletizing the packs of articles from both the pack supply and from the packaging subsystem, the packs from the packaging subsystem and from the pack supply being placeable on a same pallet by the palletizer; and a conveyor system for transporting the articles from the article supply to the packaging subsystem, to transport the packs from the packaging subsystem to the palletizer, and to transport the packs from the pack supply to the palletizer, wherein the packaging subsystem comprises a plurality of wrappers for wrapping the individual articles into a container, the conveyor system interconnecting the plurality of wrappers.

33. The system for order packing as recited in claim 32, wherein the pack supply includes a plurality of groups for holding a selected type of preformed pack and at least one gantry depalletizer, the preformed packs being removed from one of the groups and fed to the conveyor system by the at least one gantry depalletizer.

34. The system for order packing as recited in claim 33, further comprising a discharge conveyor for each of the groups, the discharge conveyors being a part of the conveyors system and the depalletizer being movable between the groups and the discharge conveyors to move packs from the groups to the discharge conveyors.

35. The system for order packing as recited in 34, claim wherein the depalletizer comprises a gantry depalletizer, the gantry depalletizer including means for gripping at least one preformed pack from one of the groups.

36. A system for forming packages of beverage containers having different types of beverage containers in each package, the system comprising:

a supply of individual beverage containers;

a packaging subsystem for packaging different types of beverage containers fed by the conveyor system into a same package;

a conveyor system for feeding a plurality of types of the beverage containers from the supply to the packaging subsystem;

means for discharging packages from the packaging subsystem; and a palletizer for palletizing beverage containers fed from the means for discharging, wherein the supply provides a different amount of space for groups of beverage containers depending upon a priority of the beverage containers in a particular group.

37. A system for forming packages of beverage containers having different types of beverage containers in each package, the system comprising:

a supply of individual beverage containers;

a packaging subsystem for packaging different types of beverage containers fed by the conveyor system into a same package, the packaging subsystem structured and arranged to package the beverage containers into different sized packages, the different sized packages having a different number of individual beverage containers therein;

a conveyor system for feeding a plurality of types of the beverage containers from the supply to the packaging subsystem;

means for discharging packages from the packaging subsystem; and a palletizer for palletizing the packages including the different sized packages, the different sized packages being placeable on a same pallet by the palletizer, wherein the packaging subsystem comprises a plurality of wrappers for wrapping the individual beverage containers into the package, each of the wrappers wrapping one size of package and one type of package, the conveyor system interconnecting the plurality of wrappers.

38. The system for forming packages as recited in claim 37, wherein the conveyor system supplies beverage containers from the supply and includes a plurality of different conveyors within the packaging subsystem, and wherein the packaging subsystem further comprises at least one laner, the at least one laner diverts beverage containers incoming from the supply on the conveyor system to one of the plurality of different conveyors in the packaging subsystem.

* * * * *

UNITED STATES PATENT AND TRADEMARK OFFICE
CERTIFICATE OF CORRECTION

PATENT NO. : 6,425,226 B1
DATED : July 30, 2002
INVENTOR(S) : Jonathan Kirschner It is certified that error appears in the above-identified patent and that said Letters Patent is hereby corrected as shown below:

Column 30,
Line 23, "claims" should read -- claim --.

Column 33,
Line 11, "34, claim" should read -- claim 34, --.

Signed and Sealed this

Tenth Day of December, 2002

JAMES E. ROGAN
*Director of the United States Patent and Trademark Office*